(12) United States Patent
Yan

(10) Patent No.: US 8,189,485 B2
(45) Date of Patent: May 29, 2012

(54) METHOD FOR ALLOCATING AND CONFIGURING TANDEM CONNECTION MONITORING (TCM)

(75) Inventor: Jun Yan, Shenzhen (CN)

(73) Assignee: Huawei Technologies Co., Ltd, Shenzhen, Guangdong ( * ) Notice: Subject to any disclaimer, the term of this patent is extended or adjusted under 35 U.S.C. 154(b) by 712 days.

(21) Appl. No.: 12/354,566

(22) Filed: Jan. 15, 2009

(65) Prior Publication Data

US 2009/0180774 A1  Jul. 16, 2009

Related U.S. Application Data

(63) Continuation of application No. PCT/CN2007/002606, filed on Aug. 30, 2007.

(30) Foreign Application Priority Data

Sep. 1, 2006  (CN) .......................... 2006 1 0112804

(51) Int. Cl.
H04B 10/08  (2006.01)
H04J 14/00  (2006.01)
G08C 23/00  (2006.01)
H04L 1/24  (2006.01)

(52) U.S. Cl. ..................... 370/241; 370/241.1; 370/248; 370/252; 370/254; 398/9; 398/25; 398/30

(58) Field of Classification Search .................. 370/241, 370/248, 249, 251, 254, 255, 907, 241.1, 370/252; 398/398/2, 9, 17, 19, 25, 33; 714/47.1
See application file for complete search history.

(56) References Cited

U.S. PATENT DOCUMENTS 7,554,923 B2 *  6/2009  Huck et al. ..................... 370/242
7,583,697 B2 *  9/2009  Zou .............................. 370/466
(Continued)

FOREIGN PATENT DOCUMENTS

CN  1288305 A  3/2001
(Continued)

OTHER PUBLICATIONS

"Interfaces for the Optical Transport Network (OTN)" *ITU-T Standard in Force (I), International Telecommunication Union.* Mar. 16, 2003.

(Continued)

*Primary Examiner* — Chi Pham
*Assistant Examiner* — Ahmed Elallam
(74) *Attorney, Agent, or Firm* — Brinks Hofer Gilson & Lione

(57) ABSTRACT

A method for allocating and configuring TCM in an embodiment of the present invention includes: configuring the domain that needs TCM in a network and the scope of the domain; determining the ODU service that needs TCM; and allocating TCM automatically according to the ODU service trail and the configured domain; and enabling or disabling the TCM of each level. The present invention enables the system to allocate TCM automatically. The TCM levels can be allocated easily in a centralized way, or for each node in a distributed way. The present invention ensures that the TCM level allocated for the service in the forward direction corresponds to that in the reverse direction. The method is perfectly applicable to the networks of more than six operators. The TCM levels are handled according to the allocated order, thus ensuring correct insertion of AIS and BDI and unique result of insertion.

23 Claims, 11 Drawing Sheets

U.S. PATENT DOCUMENTS

| | | | |
|---|---|---|---|
| 7,630,297 B2 * | 12/2009 | Sestito et al. | 370/218 |
| 7,760,620 B2 * | 7/2010 | Yan | 370/216 |
| 2003/0097472 A1 | 5/2003 | Brissette | |
| 2003/0115307 A1 | 6/2003 | Brissette | |
| 2003/0123493 A1 * | 7/2003 | Takahashi | 370/539 |
| 2004/0184489 A1 * | 9/2004 | Brissette et al. | 370/907 |
| 2007/0189336 A1 * | 8/2007 | Zou | 370/505 |
| 2008/0212961 A1 | 9/2008 | Zhang | |
| 2009/0202239 A1 * | 8/2009 | Holness et al. | 398/33 |

FOREIGN PATENT DOCUMENTS

| | | |
|---|---|---|
| CN | 1619995 A | 5/2005 |
| CN | 1852163 A | 10/2006 |
| CN | 1852163 A | 10/2006 |
| CN | 101136700 B | 11/2011 |
| EP | 1083691 A1 | 3/2001 |
| EP | 1 372 288 A1 | 12/2003 |
| WO | WO 0110276 A1 | 2/2000 |

OTHER PUBLICATIONS

Supplementary European Search Report issued in corresponding European Patent Application No. 07 80 0823; issued Aug. 24, 2009.

International Search Report issued in corresponding PCT Application PCT/CN2007/002606; mailed Dec. 6, 2007.

Written Opinion of the International Searching Authority issued in corresponding PCT Application No. PCT/CN2007/002606; mailed Dec. 6, 2007.

"Characteristics of Optical Transport Network Hierarchy Equipment Functional Blocks." International Telecommunication Union—Telecommunication Standardization Sector (Dec. 2006):218-240.

"ITU-T G.709 up for Approval" International Telecommunication Union—Telecommunication Standardization Sector; Geneva, Switzerland (Sep. 28, 2009-Oct. 9, 2009).

Office Action issued in corresponding European Patent Application No. 07800823.2, mailed Sep. 6, 2011.

* cited by examiner

METHOD FOR ALLOCATING AND CONFIGURING TANDEM CONNECTION MONITORING (TCM)

CROSS-REFERENCE TO RELATED APPLICATIONS

This application is a continuation and claims priority to International Application No. PCT/CN2007/002606, filed on Aug. 30, 2007, which claims the priority benefit of China Patent Application No. 200610112804.6, filed on Sep. 1, 2006. The contents of the above identified applications are incorporated herein by reference in their entirety.

FIELD OF THE INVENTION

The present invention relates to the technology of monitoring subnets of an optical transport network, and in particular, to a method for allocating and configuring Tandem Connection Monitoring (TCM).

BACKGROUND

Different operators across the world have their own fibers and network equipment. Inside their subnets, the operators are solely responsible for management, maintenance and fault location of the network equipment. Moreover, the network equipment between different operators needs to connect into a greater network to serve users. That is, an end-to-end user service may be transferred through subnets of different operators. In this case, a mechanism is required to identify the quality of subnets of each specific operator.

In order to evaluate the network quality of different operators, the concept of TCM is put forward. The TCM can monitor subnets and monitor the quality of a section of trail that transfers an end-to-end service.

The Optical Data Unit (ODU) layer of an Optical Transfer Network (OTN) defines six levels of TCM overheads (OH). Each TCM overhead includes information such as Trail Tracking Identifier (TTI), Bit Interleaving Parity-8 (BIP-8), Backward Defect Indication (BDI), Backward Error Indication (BEI), State field (STAT), and Backward Incoming Azimuth Error (BIAE). The TCM can monitor continuity, connectivity, and signal quality.

According to the G.798 recommendations, in allocating six TCM levels for an end-to-end service, networks of various topologies provide an interface for the user to decide allocation and use of TCM levels.

To activate the TCM function, the user needs to set the function for each node that uses the TCM function set the TCM level and mode. The services in two directions can be set separately. For each node, a mode can be set for a TCM level (level 1 to level 6) in the source direction (transmitting direction), and a mode can be set for a TCM level in the sink direction (receiving direction). Namely, for a node, for handling a unidirectional service, the mode in the receiving direction and the mode in the transmitting direction are configurable.

The modes for the transmitting direction include an OPERATIONAL mode and a TRANSPARENT mode.

If a TCM level is set to the OPERATIONAL mode, the TCM of this level will undergo regeneration processing, for example, inserting BIP8, BEI, BIAE, BDI, TTI, and so on.

If a TCM level is set to the TRANSPARENT mode, the TCM of this level needs no processing.

The modes for the receiving direction include an OPERATIONAL mode, a TRANSPARENT mode and a MONITOR mode.

If a TCM level is set to the OPERATIONAL mode, the TCM of this level will be monitored, for example, monitoring the overhead of BIP8, BEI, BIAE, BDI, and TTI, and generating the corresponding defect; and will be undergo subsequent processing, for example, generating Alarm Indication Signal (AIS), and Trail Signal Failure (TSF).

If a TCM level is set to the MONITOR mode, the TCM of this level will be monitored, for example, monitoring the overhead of BIP8, BEI, BIAE, BDI, and TTI, and generating the corresponding defect; but without undergoing subsequent processing such as AIS and TSF.

If a TCM level is set to the TRANSPARENT mode, the TCM of this level needs no processing.

For bidirectional services, each direction is set separately.

Moreover, a contract may be signed between different operators to specify the TCM allocation.

However, the drawbacks of the prior art are: The TCM has to be allocated by the user, without providing automatic allocation. Moreover, the information such as configuration modes available to the user is not direct-viewable enough, and is perplexing to ordinary users.

In addition, one or more TCM levels are allocated to each domain fixedly in the prior art, which makes the TCM levels not enough for allocation when there are more than six domains. In this case, if multiple domains use one TCM level, another domain may attempt to use a TCM level seized by an existing domain, which makes the allocation impossible. However, another TCM level may be idle at the moment. Even if the inclusive relation of domains is considered in the fixed allocation, for example, if the prior art stipulates that a domain with an inclusive relation must not use the same TCM level fixedly, it is not necessarily appropriate.

As shown in FIG. 7, there are 16 nodes ranging from A to P in the networking diagram.

The bulleted items in FIG. 7 represent the network scope of a certain domain (for example, operator).

Domain 1: B, C, F, G
Domain 2: B, C, D, F, G, H, J, K, L

Domain 2 includes domain 1. It may be inappropriate to forbid domain 2 and domain 1 to use the same TCM level, because they should use the same TCM level properly in some circumstances. Such forbidding may be unreasonable.

Suppose that an ODU1 service is routed from node A through B, C, D, H, G, F, E, I, J, K, L to node P. A TCM needs to be allocated for the BCDHGF scope and the JKL scope of the service. A TCM needs to be allocated for the BC scope and the GF scope of domain 1. The BC scope and the GF scope of domain 1 cannot share a TCM level with the BCDHGF scope of domain 2, but can share a TCM level with the JKL scope of domain 2. Namely, the TCM allocation should consider not only the relation between domains, but also the trail of specific services and the topology of domains.

In a word, if the TDM level is allocated fixedly, it is possible that an expected TCM level is seized but other TCM levels are idle. Namely, the beforehand fixed allocation is unable to suit the complex network topology and service trails.

SUMMARY

In view of the above-mentioned drawbacks of the prior art, the present invention provides a method for allocating and configuring TCM, including:

configuring the domain that needs to be monitored through TCM in a network;

determining the service of the ODU of k order (ODUk) that needs to be monitored through TCM;

allocating the TCM automatically according to the ODUk service trail and the configured domain; and enabling or disabling each TCM level.

An apparatus for configuring TCM disclosed in an embodiment of the present invention includes:

a domain configuration unit, adapted to configure the domain that needs to be monitored through TCM in a network;

a service determining unit, adapted to determine the ODUk that needs to be monitored through TCM;

an allocating unit, adapted to allocate TCM automatically according to the ODUk service trail determined by the determining unit and the domain configured by the configuring unit; and an enabling unit, adapted to enable or disable each TCM level allocated by the allocating unit.

The present invention may accomplish these benefits: The TCM has the co-located Terminate Sink (TT_Sk) function and the Terminate Source (TT_So) function, that is, the TCM to the service in the forward direction collaborates with that in the reverse direction, and the same TCM level is applied to the same segment of the service in the forward and reverse directions. As a result, the remote information (RI_XXX) can be transferred between the same TCM level; for a trail with only one node attributable to a specific domain, no TCM is allocated; the TCM levels are handled in the order of being allocated, so that the insertion of AIS and BDI can be performed correctly and have a unique result; the TCM levels can be allocated under centralized control, for example, allocated through a Network Management System (NMS); the TCM levels can also be allocated under distributed control, and are handled sequentially, starting from the source node of the service, with the information being transferred through TCM ACT.

DETAILED DESCRIPTION

In order to make the technical solution and merits of the present invention clearer, a detailed description of the present invention is hereinafter given with reference to the accompanying drawings and embodiments.

Figure 12:
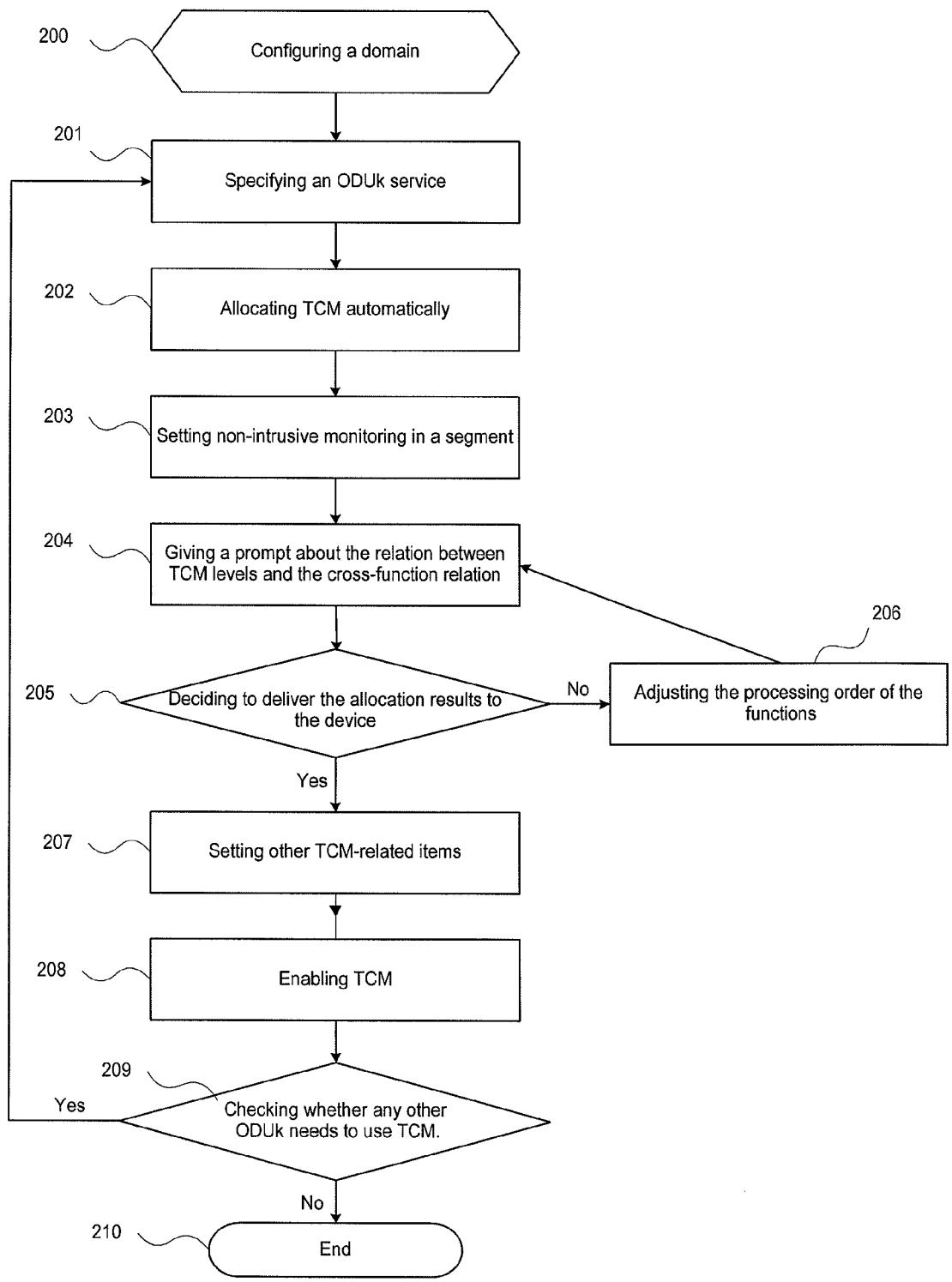
FIG. 12 shows the process of configuring TCM allocation in an embodiment of the present invention.

FIG. 12 shows the process of configuring TCM allocation in an embodiment of the present invention, which includes the following steps.

Step 200: A domain is set.

In the Graphic User Interface (GUI) of the NMS where the composition of the whole network is displayed, the user selects to create a domain. The user selects the scope of the domain on the whole network, and specifies the nodes and fibers contained in the domain. If more than one domain exists, the user repeats the process of creating a domain until all domains that need to be monitored through TCM in the network are allocated.

Step 201: An ODUk service is specified.

Selecting the ODUk service for which a TCM level needs to be allocated, and determining whether to use TCM in a single direction or both directions. The ODUk service may be an ODUk service that is preset before TCM configuration or configured during the TCM configuration.

Step 202: TCM is allocated.

Figure 9:
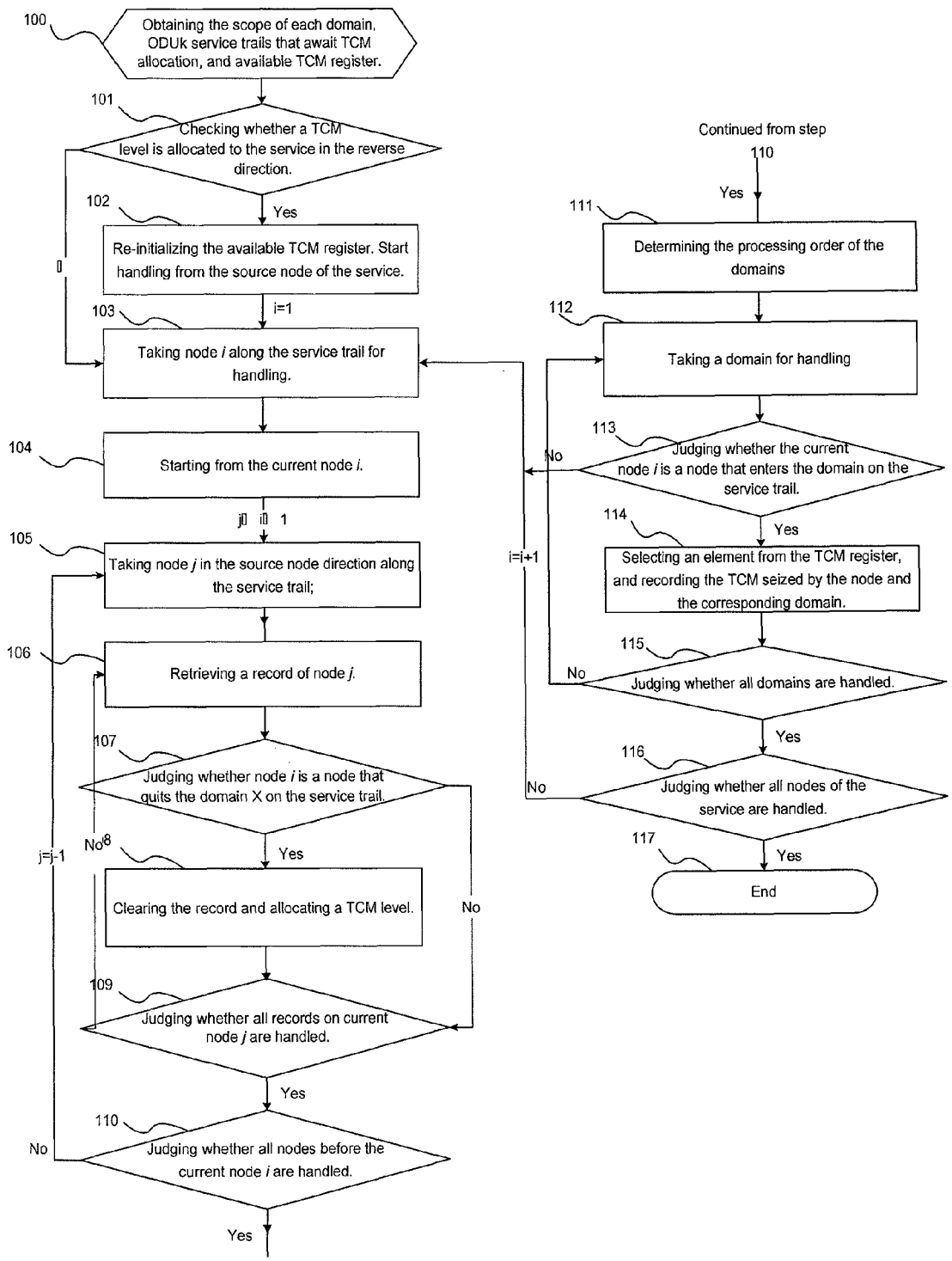
FIG. 9 is a flowchart of allocating TCM automatically in an embodiment of the present invention.

In the process of allocating TCM, the TCM allocation may be implemented in a centralized way through NMS software, or in a distributed way through information interaction between multiple nodes. The process of allocating TCM automatically is illustrated in FIG. 9.

Step 203: Non-intrusive monitoring is set in a segment.

On the ODUk service trail, the system specifies the nodes that need non-intrusive monitoring among the nodes that use each TCM level.

Step 204: A prompt about the allocation results is sent out.

The allocation results include: result of allocating each TCM level among different nodes, order of handling TCM different TCM levels in one node, and location relations of cross functions.

Step 205: The NMS determines whether to deliver the allocation results to the node device according to the allocation results and the specified conditions (for example, order of handling TCM levels in one node). The specified conditions may be determined according to the actual conditions.

If the allocation result meets the specified condition, for example, the allocation result is: The order of handling TCM in one node is "TCM2 to TCM3" (namely, handle TCM2 first, handle TCM3 later) and the specified condition is also "TCM2 to TCM3", then the NMS will deliver the result of above-mentioned automatic allocation and configuration to the node device, and then perform step 207. If the allocation result conflicts with the specified condition, for example, the allocation result is: The order of handling TCM in one node is "TCM3 to TCM2" but the specified condition is "TCM2 to TCM3", then the NMS will perform step 206.

Step 206: The handling order of each function is adjusted.

The NMS provides a GUI for the user to adjust the relations between the functions. For example, the user may adjust the allocation of different TCM levels among different nodes, and the order of handling TCM levels in one node.

Step 207: Other TCM-related items are set.

Based on the results of allocating TCM in the previous step, the NMS provides the specific configuration interface to the user according to the state of using each TCM level on different nodes.

For the source node that uses a TCM level, the user needs to set transmitting-related attributes, including deliverable TTI.

For the sink node that uses a TCM level, the user needs to set receiving-related attributes, including one or more of these items: setting whether to enable insertion of maintenance signals into the subsequent ODUk trails; setting whether to transfer the TCM signal failure and deterioration information to subsequent layers; setting enabling of subsequent actions of Trail Identifier Mismatch (TIM) and Loss of Tandem Connection (LTC); setting receivable TTI of TCM; setting TIM detection mode of the TCM; setting BIP-8 alarm threshold of TCM; setting whether to use locking (LCK) and Open Circuit Indication (OCI) as conditions of inserting the Alarm Indication Signal (AIS).

If the user sets to enable insertion of maintenance signals to the subsequent ODUk trail, the system will insert the maintenance signals to the overhead such as STAT and the payload according to the configuration and the received signals. The definition of maintenance signals complies with the definition provided by G.709 16.5 recommendations.

If the user sets to transfer the TCM signal failure and deterioration information to the subsequent layer, the system will transfer the TSF/SSF information to the subsequent layer when an aTSF or aSSF defect is detected.

If the user sets to enable subsequent actions of Loss of Tandem Connection (LTC), the system will insert a maintenance signal AIS to the overhead such as STAT and the payload and transfer the TSF/SSF information to the subsequent layer when a LTC defect is detected.

If the user sets lock (LCK) as a condition for inserting AIS, the system will insert an AIS when an LCK defect is detected.

If the user sets to use Open Circuit Indication (OCI) as a condition for inserting AIS, the system inserts an AIS when an OCI defect is detected.

For an intermediate node that uses a TCM level, if the user does not set enabling of non-intrusive monitoring, the user does not need set other items. If the user sets enabling of non-intrusive monitoring, the user needs to set: whether to transfer TCM signal failure and deterioration information to the subsequent layer; enabling of subsequent actions of TIM and LTC; receivable TTI of TCM; TIM detection mode of TCM; and BIP-8 alarm threshold of TCM.

Step 208: TCM is enabled or disabled.

The user can set enabling or disabling of each TCM level for the source node or the sink node that uses the TCM function. If the user sets to enable a TCM level, namely, activate the TCM function of a node, the system will handle according to the set TCM attributes. For a source node that uses a TCM level, the system performs ODUk Tandem Connection Monitoring Termination Source (ODUkT_TT_So) function and the ODUk Tandem Connection Monitoring/ ODUk Adaptation Source (ODUkT/ODUk_A_So) function. Specifically, the system inserts the set deliverable TTI to the overhead of the TCM; calculates the BIP-8 and inserts it into the overhead; according to the corresponding commonly located (co-located) sink functions, inserts BDI, BEI, and BIAE; and inserts the maintenance signal into the overhead such as STAT and the payload according to the configuration and the received signal. For a sink node that uses a TCM level, the system performs the ODUk TCM Termination Sink (ODUkT_TT_Sk) function and the ODUk TCM/ODUk Adaptation Sink (ODUkT/ODUk_A_Sk) function. Specifically, the system monitors the TCM according to the set TCM attributes; reports the alarm performance of this TCM level; instructs the corresponding co-located source function delivery information whether to insert backward information such as BDI, BEI or BIAE; delivers the TSF or Service Signal Failure (SSF) and inserts the maintenance signal according to the set TCM attributes. If the user sets a protection group related to this TCM level, the system uses the defects with respect to this TCM level as protection switching conditions to perform protection switching. If the user sets to disable the TCM level, the system does not handle this TCM level.

Step 209: Whether any other ODUk needs to use TCM is checked.

If yes, the system performs step 201 again; if not, the system performs step 210.

Step 210: The process is ended.

Step 202 is further described below. In the case that the system allocates TCM automatically, the system allocates the TCM levels to be used by each node on the ODUk service trail in the order of nodes on the trail (if TCM is used in both directions, this includes the service in the reverse direction). For the service in the reverse direction, the system allocates the TCM level in the corresponding order so that the TCM of the service in the forward direction corresponds to that in the reverse direction. In this way, the TCM has co-located TT_Sk and TT_So, namely, the TCM of the service in the forward direction collaborates with that in the reverse direction. Moreover, the TCM of the same level is applied to the same segment of the service in the forward and reverse directions. Therefore, the remote information (R1_XXX) can be transferred between services of the same TCM level.

In addition, if only one node belongs to a domain on a service trail, no TCM is allocated under the present invention.

The process of allocating TCM automatically under the present invention is briefly divided into the following steps.

A. The available TCM register is determined.

B. Alternatively, the system retrieves the node along the service trail. If the node (quitting node) quits the domain and a new node (incoming node) enters it, the system puts the TCM recorded on the incoming node back to an available TCM register sequentially, and clears the record; if TCM is enough for allocation (at most six domains exist), this step can be omitted; or, if the contract stipulates the relation between a domain a TCM level (for example, a domain needs to use a TCM level), this step can be performed selectively.

C. For the node on the service trail, the system determines the domain at which the service arrives, and allocates and records the TCM seized by the node corresponding to the domain sequentially.

D. The system retrieves the node next to the node on the above-mentioned service trail, and repeats step b until all nodes on the service trail are handled.

FIG. 9 is flowchart of allocating TCM automatically in an embodiment of the present invention. The TCM allocation process is hereinafter described in detail with reference to FIG. 9 and FIG. 10. The process of allocating TCM automatically under the present invention is briefly divided into the following steps:

Step 100: The scope of each domain in the networking, service trails that await TCM allocation, and available TCM register are obtained.

The system can provide an interface for the user to set the scope of each domain, and the service trail of the ODUk awaiting TCM allocation. The available TCM register has a default TCM level, namely, TCM level 6, 5, 4, 3, 2 or 1, and the TCM level can also be configured by the user. Moreover, the TCM levels in an available TCM register are generally put into use sequentially or according to other methods or conditions specified by the user. For example, the user may require a domain to prefer a certain TCM level. The ODUk service may be unidirectional or bidirectional. For bidirectional services, the TCM is allocated for two directions separately in an allocation process, and the allocation in the forward direction corresponds to the allocation in the reverse direction.

Step 101: Whether a TCM level is allocated to the service in the reverse direction is checked.

In order to make the TCM allocation in the forward direction correspond that in the reverse direction, if a TCM level is already allocated to the service in the reverse direction before the current allocation, the procedure proceeds to step 102 where the system re-initializes the available TCM register; or else step 103. Here "a TCM level allocated to the service in the reverse direction" means that the system has allocated a TCM level to the service in the reverse direction (as against the unidirectional case) and is now allocating a TCM level to the service in the forward direction. In addition, if a TCM level is already allocated to the service in the reverse direction, the system can also allocate the TCM corresponding to the service in the reverse direction directly. For example, if TCM1 for the service in the reverse direction is applied from M to N, the TCM1 allocated here is applied from N to M accordingly. In this case, the following steps can be omitted.

However, if no TCM level is allocated to the service in the reverse direction, the system can also initialize the available TCM register to any set value as required, not necessarily to a fixed value.

Step 102: The available TCM register is re-initialized.

The system initializes the TCM register available to the current TCM allocation in an order of the elements in available TCM register after a TCM level is allocated to the service in the reverse direction. For example, when a TCM level is allocated to service 2 in FIG. 10, since a TCM level is already allocated to service 1 in the reverse direction at the moment, the default TCM level of TCM register may be set to an element in the available TCM register after a TCM level is allocated to service 1, namely, TCM level 6, 5, 1, 4, 3 or 2.

Step 103: The nodes along the service trail sequentially is handled, starting from the initial node of the service (namely, service source node).

Suppose the service trail passes through n nodes in total, and node i (i=1, 2 . . . n, in which n is an integer) is retrieved in this step. When i=1, the node is the initial node on the service trail.

In this step, the system handles the nodes on the service trail sequentially, starting from i=1.

Step 104: Node is handled, starting from the initial node of the service.

Step 105: The previous node (supposing node j) in the source node direction along the service trail is retrieved.

Starting from j=i−1, the system handles the node prior to node i, namely, node j.

When the node retrieved in step 103 is the initial node on the service trail, the source node direction does not have a node prior to the source node, and the procedure proceeds to step 111. For example, since no node precedes the initial node A (namely, node 1) in service 1 shown in FIG. 10, the procedure proceeds to step 111 where the TCM is allocated in a specific order of domains.

Step 106: The TCM record of node j is retrieved, including the seized TCM and the corresponding domain (supposing domain X).

A cycle is completed from step 106 to step 109. Starting from the last record of node j, the system retrieves all records of node j sequentially and the records of the seized TCM and the corresponding domain (supposing domain X). At the moment, node j is the incoming node of the corresponding domain. For example, when node i in step 104 is node B, node j is node A on service trail 1. Node A contains three records in total, recording TCM1 corresponding to domain 1, TCM2 corresponding to domain 2, and TCM3 corresponding to domain 3. Starting from the last record on node A (namely, the record of TCM3), the system retrieves the records of TCM (TCM3) and the corresponding domain (domain 3).

If node j does not record the seized TCM (node B in service 1 shown in FIG. 10), the system applies j=j−1, and goes back to step 105 to handle the previous node.

Step 107: The system judges whether node i retrieved in step 104 is the node that quits domain X on the service trail.

In view of the relation between domain X (which is retrieved in step 106) and node i, the system judges whether node i is the node that quits the domain (domain X) on the service trail. If so, the procedure proceeds to step 108; or else step 109.

The method of judging whether the node quits X on the service trail is: If node i is the last node on the service trail and belongs to the domain (domain X), the node (node i) is regarded as the node that quits the domain. If node i is not the last node on the service trail but belongs to the domain, and the node next to the node on the service trail does not belong to the domain, the node is also regarded as the node that quits the domain. For example, for node B in the above-mentioned step, since the node is the node that quits domain 1 on the service trail, the procedure proceeds to step 108.

Step 108: The record is cleared and a TCM level is allocated.

When a TCM level is used up, the system may clear the records of the seized TCM level and the corresponding domain on node j (incoming node), and puts the TCM level back to the available TCM register.

For example, since node B is determined as the node that quits domain 1 in step 107, the system clears the record of the seized TCM1 kept on the incoming node (node A) of domain 1 and the corresponding domain 1, and puts TCM1 back to the available TCM register in step 108.

In allocating the TCM applied to the domain, if the incoming node is different from the quitting node, namely, the service enters domain X at node j and quits domain X at node i, the system may allocate a TCH level applied to domain X, and the corresponding segment is the service trail from node j to node i. When a TCM level is used up, the system may clear the record of the domain corresponding to the seized TCM level recorded on the incoming node, and puts the TCM level back to the available TCM register.

Step 109: Whether all records on node j are handled is judged.

A cycle is completed from step 106 to step 109. In this step, the system handles all records on node j. If all records are finished, the procedure proceeds to step 110; or else step 106. For node A, three records are kept. Therefore, after the outmost record is finished, the procedure proceeds to steps 106-109 to handle the remaining two records.

Step 110: Whether all nodes before node i are handled is judged.

A cycle is completed from step 105 to step 110. In this step, the system handles all nodes before node i. If all nodes are finished, the procedure proceeds to step 111; otherwise, the system applies j=j−1, and proceeds to step 105.

The objectives of step 105 to step 110 under the present invention are: When the progress goes to a node i, the system identifies the TCM levels that have been in use, judges the domains from which the service has quit, finds the corresponding incoming node for processing, and clears the corresponding records, thus obtaining the information about the latest state of TCM utilization.

Figure 10:
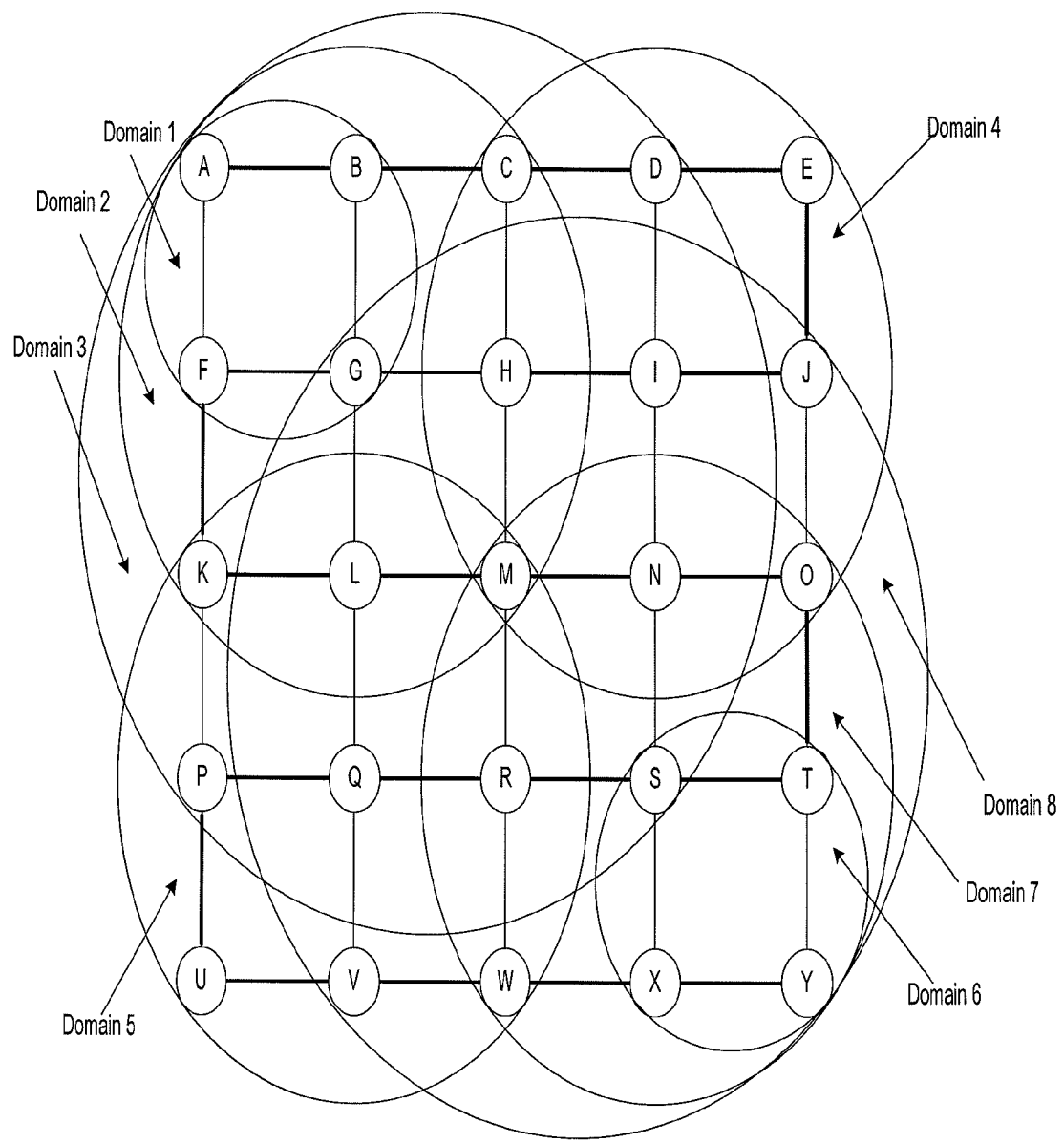
FIG. 10 is a networking diagram in an embodiment of the present invention.

As described in step 105 to step 110 above, the system handles all nodes before node i, thus obtaining the TCM recorded on the incoming node corresponding to the domain(s) containing node i; and puts the TCM recorded on the incoming node j of the domain back to the TCM register when the system determines that node i quits the domain; and clears the TCM record of the incoming node j. Meanwhile, the available TCM register saves the available TCM level again. For example, as shown in FIG. 10, in the process of allocating TCM for service trail 1, when handling node M according to step 105 to step 110, the system needs to handle all nodes before node M sequentially, namely, L, K, F, G, H, I, J, E, D, C, B, and A. First, the system handles node L, obtains the records of the TCM seized by node L and the corresponding domain (TCM4 is seized, corresponding to domain 8), and judges whether node M is the node that quits domain 8. When the system determines that node M is not the node that quits domain 8, the system further handles node K, obtains the records of the TCM seized by node K and the corresponding domain (TCM3 is seized, corresponding to domain 5), and judges whether node M is the node that quits domain 5. Since node M is the node that quits domain 5 on the service trail, the system puts the TCM3 recorded on node K that enters domain 5 back to the available TCM register, and clears records of TCM3 and the corresponding domain 5. Then the system handles the previous nodes. Through sequential processing, the system determines that node M is the node that quits domain 2, at which node H arrives. Therefore, the system puts the TCM record kept on node H back to the available TCM register, and clears the TCM record of the corresponding incoming node H. As described above, the system handles the TCM of the domains that node M quits in this order: The system releases the TCM3 which is applied to domain 5 and seized by node K, and then releases the TCM2 which is applied to domain 2 and seized by node H.

For the purpose of the present invention, the present invention is not limited to the procedure described in step 105 to step 110 above, in which the system determines the domain that the node quits according to the order of handling the nodes before node i, and other processing steps may apply. For example, the following process may be used instead of determining the TCM in use and the domain that the node quits according to the sequence of handling the nodes before node i sequentially:

Without handling all nodes before node i, the system handles only the incoming node closest to the initial node of the service among the incoming nodes in the domain that contains node i. For example, when node i is node J shown in FIG. 10, the system only needs to handle the incoming node in domain 4 that contains node J in FIG. 10, and node C.

According to the order of arranging the domains that contain node i, determining the order of handling the domains that the node quits. For example, when the processing procedure comes to node M on the service trail 1, the system determines the domains that node M quits (domain 2 and domain 5) according to the domains that contain node M (domains 2, 3, 4, 5, 7, 8); obtains the TCM records of the incoming node corresponding to the domain that node M quits; and then puts the TCM record of the corresponding node back to the available TCM register according to the preset order of the domains, and clears the TCM record of the corresponding incoming node.

The preset order may be the serial number order of the domains. For example, if no TCM is allocated to the service in the reverse direction, the system can allocate the TCM in an order of domain numbers from low to high; if a TCM level is already allocated to the service in the reverse direction, the system can allocate the TCM in an order of domain numbers from high to low; or vise versa; or likewise.

In this way, when the processing procedure comes to node M on service trail 1, if the service is handled according to the domain numbers from low to high, the system releases TCM2 which is applied to domain 2 and seized by node H, and then releases TCM3 which is applied to domain 5 and seized by node K.

The above-mentioned is only an example, without limiting the processing procedure of the node.

Step 111: If all nodes before node i are handled, the system allocates a TCM level to node i according to the order of the domains that the node enters.

First, the system determines the processing order of the domains.

In order to accomplish mapping between the forward direction and the reverse direction, the system needs to use different processing orders of domains when handling the services in the forward and reverse directions. For example, if no TCM is allocated to the service in the reverse direction, the system allocates the TCM in an order of domain numbers from low to high; if a TCM level is already allocated to the service in the reverse direction, the system allocates the TCM in an order of domain numbers from high to low; or vise versa; or likewise.

Step 112: A domain for processing according to the preset order is retrieved.

A cycle is completed from step 112 to step 115, in which all domains are handled sequentially.

Step 113: The system judges whether node i is a node that enters the domain handled on the service trail.

If node i is a node that enters the domain handled on the service trail, the procedure proceeds to step 114, or else step 115.

The method for the system to judge whether node i enters the domain is: If the current node is the initial node of the service and the current node belongs to the domain, the node is regarded as entering the domain. If the current node is not the initial node of the service, the node prior to the current node on the service trail does not belong to the domain, and the current domain belongs to the domain, then the node is also regarded as entering the domain.

Step 114: An element from the TCM register is selected, and the TCM seized by the node and the corresponding domain is recorded.

The system selects an element from the available TCM register when seeing node N enter a domain, and records the TCM seized by the node and the corresponding domain, namely, applies the TCM seized by the node to the corresponding domain.

If only one node belongs to a domain on a service trail, namely, the node that enters a domain is the same as the node that quits the domain, the system does not allocate any TCM.

The available TCM register stores idle TCM levels. For the allocation of TCM levels for node i, the system may select an element sequentially from the TCM levels, or select a TCM level under certain restrictions or requirements. For example, a domain prefers a TCM level. If the available TCM register is empty, it indicates that all six TCM levels are used up, and the system will give a prompt indicating allocation failure, and then proceed to step 117.

Step 115: Whether all domains are handled is judged.

A cycle is completed from step 112 to step 115, in which all domains are handled in the order determined in step 111. If any other domains need to be handled, the system performs step 112 until all domains are handled. If all domains are finished, the procedure proceeds to step 116.

If node N neither quits the domain nor enters the domain, it indicates that the node that enters a domain is the same as the node that quits the domain, and the system does not perform TCM processing.

Step 116: Whether all nodes of the service are handled is judged.

A cycle is completed from step 103 to step 116, in which all nodes are handled sequentially along the service trail from the source node to the sink node. If any other node needs to be handled, the system performs step 103. If all nodes are finished, the procedure proceeds to step 117.

Step 117: The process is ended.

An example is given below to describe the detailed process of allocating and configuring TCM.

Step 200: A domain is set.

In the GUI of the NMS where the composition of the whole network is displayed, the user selects to create a domain and selects the scope of the domain to be created on the whole network. FIG. 10 is a networking diagram in an embodiment of the present invention, illustrating 25 nodes that range from A to Y. Suppose that domain 1 is created first. The user specifies domain 1 to include nodes A, B, F and G and the connected fibers. Then user creates domain 2 and specifies domain 2 to include nodes A, B, C, F, G, H, K, L and M and the connected fibers. As a result, eight domains are created.

In the networking diagram in FIG. 10, the bulleted items represent the network scope of a certain domain (for example, operator). The TCM of an Optical Transport Network (OTN) supports complex scenarios such as nesting and cascading. In order to demonstrate the power capabilities of the TCM of an OTN, the domain (for example, operator) is rendered as the overlapping and nested form. Domain 1 to domain 8 in FIG. 10 are the domains created in this step.

Domain 1: A, B, F, G
Domain 2: A, B, C, F, G, H, K, L, M
Domain 3: A, B, C, D, F, G, H, I, K, L, M, N, P, Q, R, S
Domain 4: C, D, E, H, I, J, M, N, O
Domain 5: K, L, M, P, Q, R, U, V, W
Domain 6: S, T, X, Y
Domain 7: M, N, O, R, S, T, W, X, Y
Domain 8: G, H, I, J, L, M, N, O, Q, R, S, T, V, W, X, Y A nested relation exists between domains 1, 2 and 3; and between domains 6, 7 and 8. An overlapping relation exists between domains 2, 4, 5 and 7; and a cascading relation exists between domain 1 and domain 6.

Step 201: An ODUk service is specified.

The user selects the ODU service for which a TCM level needs to be allocated, selects service 1 (ODU1 service) already configured, and selects to use TCM in a single direction. Referring to the networking diagram in FIG. 10, service 1 runs from node A through nodes B, C, D, E, J, I, H, G, F, K, L, M, N, O, T, S, R, Q, P, U, V, W, X to node Y.

Step 202: TCM is allocated automatically.

First, the system sets the available TCM register according to the specified service. Since no TCM level is allocated to the service in the reverse direction, the TCM register is initialized to TCM level 6, 5, 4, 3, 2 or 1; in which TCM level 1 has the top preference.

The TCMs are allocated for service 1 automatically along the nodes that the service passes through. Table 1 shows the specific process.

TABLE 1

| Node | Step | Seized TCM | Corresponding domain | Available TCM |
|---|---|---|---|---|
| A | No node exists before the current node. No domain is quit by the node as detected by the system. After detecting that the node enters domain 1, the system selects an element (1) from the available TCMs, and records that the current node (A) seizes TCM1, which is to be applied to domain 1. | 1 | 1 | 654320 |
| A | After detecting that the node enters domain 2, the system selects an element (2) from the available TCMs, and records that the current node (A) seizes TCM2, which is to be applied to domain 2. | 2 | 2 | 654300 |
| A | After detecting that the node enters domain 3, the system selects an element (3) from the available TCMs, and records that the current node (A) seizes TCM3, which is to be applied to domain 3. | 3 | 3 | 654000 |
| B | After detecting that the node quits domain 1, the system puts the TCM1 recorded on node A that enters domain 1 back to the available TCMs, and clears the record of the TCM1 applied to domain 1 on node A. The allocated TCM1 is applied between node A and node B. | | | 654100 |
| C | After detecting that the node quits domain 2, the system puts the TCM2 recorded on node A that enters domain 2 back to the available TCMs, and clears the record of the TCM2 applied to domain 2 on node A. The allocated TCM2 is applied between node A and node C. | | | 654120 |
| C | After detecting that the node enters domain 4, the system selects an element (2) from the | 2 | 4 | 654100 |

TABLE 1-continued

| Node | Step | Seized TCM | Corresponding domain | Available TCM |
|---|---|---|---|---|
| | available TCMs, and records that the current node (C) seizes TCM2, which is to be applied to domain 4. | | | |
| D | After detecting that the node quits domain 3, the system puts the TCM3 recorded on node A that enters domain 3 back to the available TCMs, and clears the record of the TCM3 applied to domain 3 on node A. The allocated TCM3 is applied between node A and node D. | | | 654130 |
| E | The system detects no node entering or quitting the domain, and performs no processing. | | | |
| J | After detecting that the node enters domain 8, the system selects an element (3) from the available TCMs, and records that the current node (J) seizes TCM3, which is to be applied to domain 8. | 3 | 8 | 654100 |
| I | After detecting that the node enters domain 3, the system selects an element (1) from the available TCMs, and records that the current node (I) seizes TCM1, which is to be applied to domain 3. | 1 | 3 | 654000 |
| H | After detecting that the node quits domain 4, the system puts the TCM2 recorded on node C that enters domain 4 back to the available TCMs, and clears the record of the TCM2 applied to domain 4 on node C. The allocated TCM2 is applied between node C and node H. | | | 654200 |
| H | After detecting that the node enters domain 2, the system selects an element (2) from the available TCMs, and records that the current node (H) seizes TCM2, which is to be applied to domain 2. | 2 | 2 | 654000 |
| G | After detecting that the node quits domain 8, the system puts the TCM3 recorded on node J that enters domain 8 back to the available TCMs, and clears the record of the TCM3 applied to domain 8 on node J. The allocated TCM3 is applied between node J and node G. | | | 654300 |
| G | After detecting that the node enters domain 1, the system selects an element (3) from the available TCMs, and records that the current node (G) seizes TCM3, which is to be applied to domain 1. | 3 | 1 | 654000 |
| F | After detecting that the node quits domain 1, the system puts the TCM3 recorded on node G that enters domain 1 back to the available TCMs, and clears the record of the TCM3 applied to domain 1 on node G. The allocated TCM3 is applied between node G and node F. | | | 654300 |
| K | After detecting that the node enters domain 5, the system selects an element (3) from the available TCMs, and records that the current node (K) seizes TCM3, which is to be applied to domain 5. | 3 | 5 | 654000 |
| L | After detecting that the node enters domain 8, the system selects an element (4) from the available TCMs, and records that the current node (L) seizes TCM4, which is to be applied to domain 8. | 4 | 8 | 650000 |
| M | After detecting that the node quits domain 5, the system puts the TCM3 recorded on node K that enters domain 5 back to the available TCMs, and clears the record of the TCM3 applied to domain 5 on node K. The allocated TCM3 is applied between node K and node M. | | | 653000 |
| M | After detecting that the node quits domain 2, the system puts the TCM2 recorded on node H that enters domain 2 back to the available TCMs, and clears the record of the TCM2 applied to domain 2 on node H. The allocated TCM2 is applied between node H and node M. | | | 653200 |
| M | After detecting that the node enters domain 4, the system selects an element (2) from the available TCMs, and records that the current | 2 | 4 | 653000 |

TABLE 1-continued

| Node | Step | Seized TCM | Corresponding domain | Available TCM |
|---|---|---|---|---|
| | node (M) seizes TCM2, which is to be applied to domain 4. | | | |
| M | After detecting that the node enters domain 7, the system selects an element (3) from the available TCMs, and records that the current node (M) seizes TCM3, which is to be applied to domain 7. | 3 | 7 | 650000 |
| N | After detecting that the node quits domain 3, the system puts the TCM1 recorded on node I that enters domain 3 back to the available TCMs, and clears the record of the TCM1 applied to domain 3 on node H. The allocated TCM1 is applied between node I and node N. | | | 651000 |
| O | After detecting that the node quits domain 4, the system puts the TCM2 recorded on node M that enters domain 4 back to the available TCMs, and clears the record of the TCM2 applied to domain 4 on node M. The allocated TCM2 is applied between node M and node O. | | | 651200 |
| T | After detecting that the node enters domain 6, the system selects an element (2) from the available TCMs, and records that the current node (T) seizes TCM2, which is to be applied to domain 6. | 2 | 6 | 651000 |
| S | After detecting that the node quits domain 6, the system puts the TCM2 recorded on node T that enters domain 6 back to the available TCMs, and clears the record of the TCM2 applied to domain 6 on node T. The allocated TCM2 is applied between node T and node S. | | | 651200 |
| S | After detecting that the node enters domain 3, the system selects an element (2) from the available TCMs, and records that the current node (S) seizes TCM2, which is to be applied to domain 3. | 2 | 3 | 651000 |
| R | After detecting that the node quits domain 7, the system puts the TCM3 recorded on node M that enters domain 7 back to the available TCMs, and clears the record of the TCM3 applied to domain 7 on node M. The allocated TCM3 is applied between node M and node R. | | | 651300 |
| R | After detecting that the node enters domain 5, the system selects an element (3) from the available TCMs, and records that the current node (R) seizes TCM3, which is to be applied to domain 5. | 3 | 5 | 651000 |
| Q | After detecting that the node quits domain 8, the system puts the TCM4 recorded on node L that enters domain 8 back to the available TCMs, and clears the record of the TCM4 applied to domain 8 on node L. The allocated TCM4 is applied between node L and node Q. | | | 651400 |
| P | After detecting that the node quits domain 3, the system puts the TCM2 recorded on node S that enters domain 3 back to the available TCMs, and clears the record of the TCM2 applied to domain 3 on node S. The allocated TCM2 is applied between node S and node P. | | | 651420 |
| U | The system detects no node entering or quitting the domain, and performs no processing. | | | 651420 |
| V | After detecting that the node enters domain 8, the system selects an element (2) from the available TCMs, and records that the current node (V) seizes TCM2, which is to be applied to domain 8. | 2 | 8 | 651400 |
| W | After detecting that the node quits domain 5, the system puts the TCM3 recorded on node R that enters domain 5 back to the available TCMs, and clears the record of the TCM3 applied to domain 3 on node R. The allocated TCM3 is applied between node R and node W. | | | 651430 |
| W | After detecting that the node enters domain 7, the system selects an element (3) from the available TCMs, and records that the current | 3 | 7 | 651400 |

TABLE 1-continued

| Node | Step | Seized TCM | Corresponding domain | Available TCM |
|------|------|------------|---------------------|---------------|
|   | node (W) seizes TCM3, which is to be applied to domain 7. | | | |
| X | After detecting that the node enters domain 6, the system selects an element (4) from the available TCMs, and records that the current node (X) seizes TCM4, which is to be applied to domain 6. | 4 | 6 | 651000 |
| Y | After detecting that the node quits domain 6, the system puts the TCM4 recorded on node X that enters domain 6 back to the available TCMs, and clears the record of the TCM4 applied to domain 6 on node X. The allocated TCM4 is applied between node X and node Y. | | | 651400 |
| Y | After detecting that the node quits domain 7, the system puts the TCM3 recorded on node W that enters domain 7 back to the available TCMs, and clears the record of the TCM3 applied to domain 7 on node W. The allocated TCM3 is applied between node W and node Y. | | | 651430 |
| Y | After detecting that the node quits domain 8, the system puts the TCM2 recorded on node V that enters domain 8 back to the available TCMs, and clears the record of the TCM2 applied to domain 8 on node V. The allocated TCM2 is applied between node V and node Y. | | | 651432 |

To sum up, the TCM levels are allocated as follows through the above process:

| No. | TCM level | Source node | Intermediate node | Sink node | Domain |
|-----|-----------|-------------|-------------------|-----------|--------|
| 1 | TCM1 | A | None | B | 1 |
| 2 | TCM2 | A | B | C | 2 |
| 3 | TCM3 | A | BC | D | 3 |
| 4 | TCM2 | C | DEJI | H | 4 |
| 5 | TCM3 | J | IH | G | 8 |
| 6 | TCM3 | G | None | F | 1 |
| 7 | TCM3 | K | L | M | 5 |
| 8 | TCM2 | H | GFKL | M | 2 |
| 9 | TCM1 | I | HGFKLM | N | 3 |
| 10 | TCM2 | M | N | O | 4 |
| 11 | TCM2 | T | None | S | 6 |
| 12 | TCM3 | M | NOTS | R | 7 |
| 13 | TCM4 | L | MNOTSR | Q | 8 |
| 14 | TCM2 | S | RQ | P | 3 |
| 15 | TCM3 | R | QPUV | W | 5 |
| 16 | TCM4 | X | None | Y | 6 |
| 17 | TCM3 | W | X | Y | 7 |
| 18 | TCM2 | V | WX | Y | 8 |

Step 203: Non-intrusive monitoring in a segment is set.

On the ODUk service trail, the system specifies the nodes that need non-intrusive monitoring among the nodes that use each TCM level. For example, the system specifies node C for performing non-intrusive monitoring among nodes A, B, C and D that use TCM3; the system specifies node T for performing non-intrusive monitoring among nodes L, M, N, O, T, S, R, and Q that use TCM4; the system specifies node P for performing non-intrusive monitoring among nodes R, Q, P, U, V, and W that use TCM3.

Step 204: A prompt about the allocation results to the user is sent out.

Figure 13:
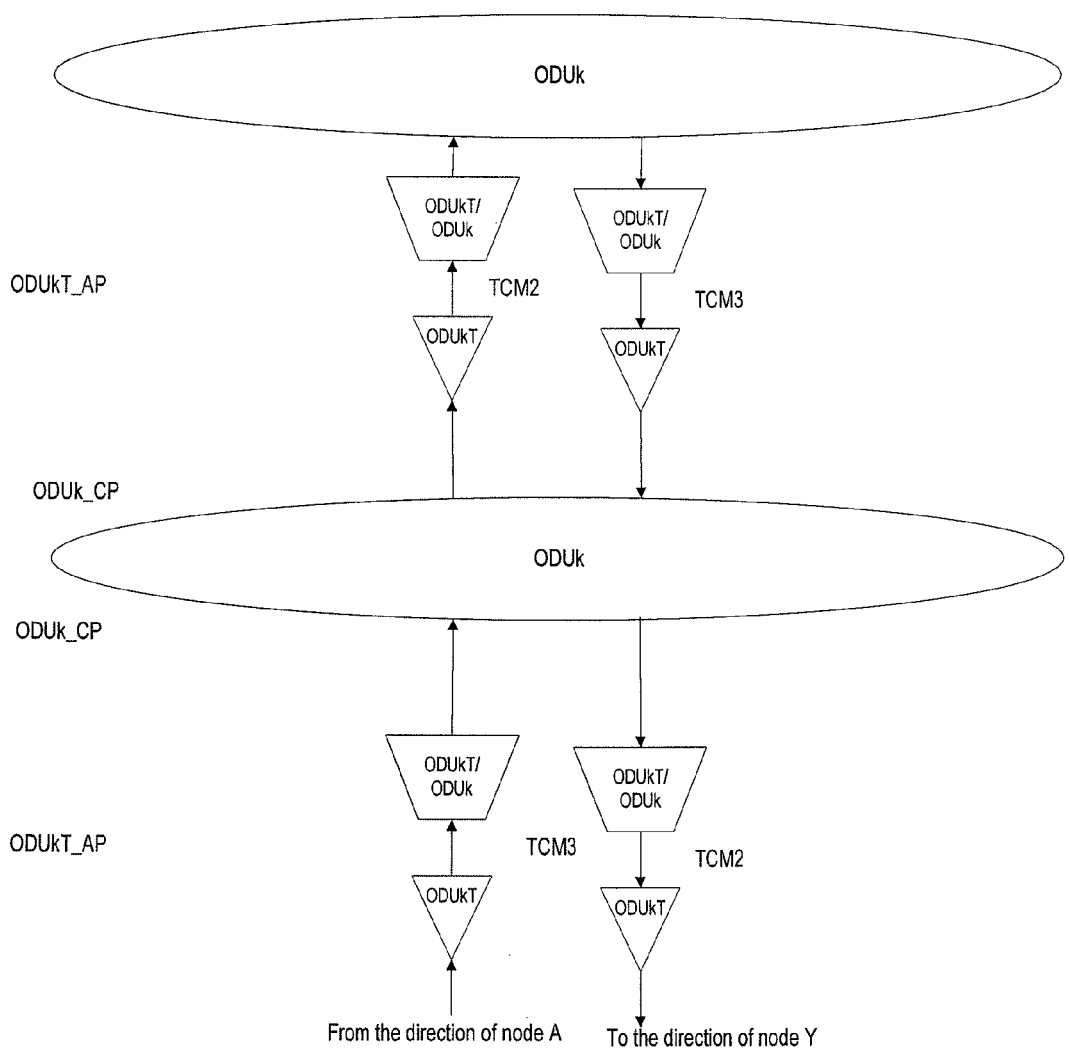
FIG. 13 shows the atomic function of node M in a single direction (from A to Y) shown in FIG. 10.

The allocation results sent to the user include: result of allocating each TCM level among different nodes, order of handling TCM different TCM levels in one node, and location relations of cross functions. For the allocation results of different TCM levels, see the above-mentioned summary. If the user selects a node such as node M, the system provides a function block diagram that shows how node M handles the TCM function, as shown in FIG. 13.

Step 205: The NMS determines whether to deliver the allocation results to the device according to the allocation results and the specified conditions (for example, order of handling TCM levels in one node).

If the allocation result meets the specified condition, for example, the allocation result is: The order of handling TCM in one node is "TCM2 to TCM3" and the specified condition is also "TCM2 to TCM3", then the NMS will deliver the result of above-mentioned automatic allocation and configuration to the device, and then perform step 207.

Step 207: Other TCM-related items are set.

Based on the results of allocating TCM in the previous step, the NMS provides the specific configuration interface to the user according to the state of using each TCM level on different nodes.

For example, for the TCM1 used among nodes A and B, as regards the source node A, the user needs to set transmitting-related attributes of TCM1, including deliverable TTI. As regards the sink node B, the user needs to set receiving-related attributes, including: enabling of insertion of maintenance signals (AIS) for subsequent ODUk trails; enabling of transferring TCM signal failure and deterioration information to the subsequent layer; enabling of subsequent actions of TIM and LTC (LTCActDis); setting receivable TTI of TCM; setting TIM detection mode of TCM to Source access point identifier (SAPI)+Destination access point identifier (DAPI); and setting BIP-8 alarm threshold of TCM. The first two items are converted by the NMS to mode information, which is delivered to the device. Namely, if the user sets enabling, the NMS will deliver the OPERATIONAL mode to the device; if the user sets disabling, the NMS will deliver the MONITOR mode to the device. The remaining items are forwarded by the NMS to the device.

For the TCM2 used among nodes A, B and C, as regards the source node A, the user needs to set transmitting-related attributes of TCM1, including deliverable TTI. As regards the sink node B, the user needs to set receiving-related attributes, including: enabling of insertion of maintenance signals (AIS) for subsequent ODUk trails; enabling of transferring TCM signal failure and deterioration information to the subsequent layer; enabling of subsequent actions of TIM and LTC (LT-CActDis); setting receivable TTI of TCM; setting TIM detection mode of TCM to SAPI+DAPI; and setting BIP-8 alarm threshold of TCM.

For the TCM3 used among nodes A, B, C and D, as regards the source node A, the user needs to set transmitting-related attributes of TCM1, including deliverable TTI. As regards the sink node D, the user needs to set receiving-related attributes, including: enabling of insertion of maintenance signals (AIS) for subsequent ODUk trails; enabling of transferring TCM signal failure and deterioration information to the subsequent layer; enabling of subsequent actions of TIM and LTC (LT-CActDis); setting receivable TTI of TCM; setting TIM detection mode of TCM to SAPI+DAPI; and setting BIP-8 alarm threshold of TCM. As regards node C that enables the non-intrusive monitoring, the user needs to set receiving-related attributes, including: enabling of transferring TCM signal failure and deterioration information to the subsequent layer; enabling of subsequent actions of TIM and LTC (LTCAct-Dis); setting receivable TTI of TCM; setting TIM detection mode of TCM to SAPI+DAPI; and setting BIP-8 alarm threshold of TCM.

Likewise, the user sets the 18 source nodes and sink nodes of each TCM level applied to each segment, and sets the nodes that enable the non-intrusive monitoring of the corresponding TCM level.

Step 208: The TCM is enabled.

The user sets enabling of TCM. Each level of TCM is set separately, or multiple TCM levels are selected at a time for uniform enabling. The NMS delivers the information about enabling of each TCM level to the source node and the sink node of this TCM level. If the user selects the TCM which is numbered "1" (TCM1) and applied between node A and node B, the NMS delivers the information about enabling of the source function of TCM1 to the source node A, and delivers the information about enabling of the sink function of TCM1 to the sink node B. Likewise, the 18 TCM levels are enabled sequentially.

Step 209: Whether any other ODUk needs to use TCM is checked.

The system checks whether any other ODUk service needs to use TCM, and performs step 201 again (if any, the TCM configuration is finished).

Step 201: An ODUk service is specified.

The user selects the ODU service for which a TCM level needs to be allocated, selects service 2 (ODUL service), and selects to use TCM in both directions. In the embodiment of the present invention, the user selects service 2 as a service reverse to service 1. Referring to the networking diagram in FIG. 10, service 2 runs from node Y through nodes Y, X, W, V, U, P, Q, R, S, T, O, N, M, L, K, F, G, H, I, J, E, D, C, B to node A.

Step 202: The TCM is allocated automatically.

The trail of service 2 is the same as that of service 1 except for the reverse signal flow. Since a TCM level is already allocated to service 1 in the reverse direction, the default TCM level of the TCM register may be set to an element in the available TCM register after a TCM level is allocated to service 1, for example, TCM level 6, 5, 1, 4, 3, or 2, in which TCM level 2 has the top preference.

The system allocates a TCM level to service 2 along the nodes that the service passes through. Table 2 shows the specific process.

TABLE 2

| Node | Step | Seized TCM | Corresponding domain | Available TCM |
|---|---|---|---|---|
| Y | No node exists before the current node. No domain is quit by the node as detected by the system. After detecting that the node enters domain 8, the system selects an element (2) from the available TCMs, and records that the current node (Y) seizes TCM2, which is to be applied to domain 8. | 2 | 8 | 651430 |
| Y | After detecting that the node enters domain 7, the system selects an element (3) from the available TCMs, and records that the current node (Y) seizes TCM3, which is to be applied to domain 7. | 3 | 7 | 651400 |
| Y | After detecting that the node enters domain 6, the system selects an element (4) from the available TCMs, and records that the current node (Y) seizes TCM4, which is to be applied to domain 6. | 3 | 3 | 651000 |
| X | After detecting that the node quits domain 6, the system puts the TCM4 recorded on node Y that enters domain 6 back to the available TCMs, and clears the record of the TCM4 applied to domain 6 on node Y. The allocated TCM4 is applied between node Y and node X. | | | 651400 |
| W | After detecting that the node quits domain 7, the system puts the TCM3 recorded on node Y that enters domain 7 back to the available TCMs, and clears the record of the TCM3 applied to domain 7 on node Y. The allocated TCM3 is applied between node Y and node W. | | | 651430 |
| W | After detecting that the node enters domain 5, the system selects an element (3) from the available TCMs, and records that the current | 3 | 5 | 651400 |

TABLE 2-continued

| Node | Step | Seized TCM | Corresponding domain | Available TCM |
|---|---|---|---|---|
|  | node (W) seizes TCM3, which is to be applied to domain 5. |  |  |  |
| V | After detecting that the node quits domain 8, the system puts the TCM2 recorded on node Y that enters domain 8 back to the available TCMs, and clears the record of the TCM2 applied to domain 8 on node Y. The allocated TCM2 is applied between node Y and node V. |  |  | 651420 |
| U | The system detects no node entering or quitting the domain, and performs no processing. |  |  | 651420 |
| P | After detecting that the node enters domain 3, the system selects an element (2) from the available TCMs, and records that the current node (P) seizes TCM2, which is to be applied to domain E. | 2 | 3 | 651400 |
| Q | After detecting that the node enters domain 8, the system selects an element (4) from the available TCMs, and records that the current node (Q) seizes TCM4, which is to be applied to domain 8. | 4 | 8 | 651000 |
| R | After detecting that the node quits domain 5, the system puts the TCM3 recorded on node W that enters domain 5 back to the available TCMs, and clears the record of the TCM3 applied to domain 5 on node W. The allocated TCM3 is applied between node W and node R. |  |  | 651300 |
| R | After detecting that the node enters domain 7, the system selects an element (3) from the available TCMs, and records that the current node (R) seizes TCM3, which is to be applied to domain 7. | 3 | 7 | 651000 |
| S | After detecting that the node quits domain 3, the system puts the TCM2 recorded on node P that enters domain 3 back to the available TCMs, and clears the record of the TCM2 applied to domain 3 on node P. The allocated TCM2 is applied between node P and node S. |  |  | 651200 |
| S | After detecting that the node enters domain 6, the system selects an element (2) from the available TCMs, and records that the current node (S) seizes TCM2, which is to be applied to domain 6. | 2 | 6 | 651000 |
| T | After detecting that the node quits domain 6, the system puts the TCM2 recorded on node S that enters domain 6 back to the available TCMs, and clears the record of the TCM2 applied to domain 6 on node S. The allocated TCM2 is applied between node S and node T. |  |  | 651200 |
| O | After detecting that the node enters domain 4, the system selects an element (2) from the available TCMs, and records that the current node (O) seizes TCM2, which is to be applied to domain 4. | 2 | 4 | 651000 |
| N | After detecting that the node enters domain 3, the system selects an element (1) from the available TCMs, and records that the current node (N) seizes TCM1, which is to be applied to domain 3. | 1 | 3 | 650000 |
| M | After detecting that the node quits domain 4, the system puts the TCM2 recorded on node O that enters domain 4 back to the available TCMs, and clears the record of the TCM2 applied to domain 4 on node O. The allocated TCM2 is applied between node O and node M. |  |  | 652000 |
| M | After detecting that the node quits domain 7, the system puts the TCM3 recorded on node R that enters domain 7 back to the available TCMs, and clears the record of the TCM3 applied to domain 7 on node R. The allocated TCM3 is applied between node R and node M. |  |  | 652300 |
| M | After detecting that the node enters domain 5, the system selects an element (3) from the available TCMs, and records that the current | 3 | 5 | 652000 |

TABLE 2-continued

| Node | Step | Seized TCM | Corresponding domain | Available TCM |
|---|---|---|---|---|
| | node (M) seizes TCM3, which is to be applied to domain 5. | | | |
| M | After detecting that the node enters domain 2, the system selects an element (2) from the available TCMs, and records that the current node (M) seizes TCM2, which is to be applied to domain 2. | 2 | 2 | 650000 |
| L | After detecting that the node quits domain 8, the system puts the TCM4 recorded on node Q that enters domain 8 back to the available TCMs, and clears the record of the TCM4 applied to domain 8 on node Q. The allocated TCM4 is applied between node Q and node L. | | | 654000 |
| K | After detecting that the node quits domain 5, the system puts the TCM3 recorded on node M that enters domain 5 back to the available TCMs, and clears the record of the TCM3 applied to domain 5 on node M. The allocated TCM3 is applied between node M and node K. | | | 654300 |
| F | After detecting that the node enters domain 1, the system selects an element (3) from the available TCMs, and records that the current node (F) seizes TCM3, which is to be applied to domain 1. | 3 | 1 | 654000 |
| G | After detecting that the node quits domain 1, the system puts the TCM3 recorded on node F that enters domain 1 back to the available TCMs, and clears the record of the TCM3 applied to domain 1 on node F. The allocated TCM3 is applied between node F and node G. | | | 654300 |
| G | After detecting that the node enters domain 8, the system selects an element (3) from the available TCMs, and records that the current node (G) seizes TCM3, which is to be applied to domain 8. | 3 | 8 | 654000 |
| H | After detecting that the node quits domain 2, the system puts the TCM2 recorded on node M that enters domain 7 back to the available TCMs, and clears the record of the TCM2 applied to domain 2 on node M. The allocated TCM2 is applied between node M and node H. | | | 654200 |
| H | After detecting that the node enters domain 4, the system selects an element (2) from the available TCMs, and records that the current node (H) seizes TCM2, which is to be applied to domain 4. | 2 | 4 | 654000 |
| I | After detecting that the node quits domain 3, the system puts the TCM1 recorded on node N that enters domain 3 back to the available TCMs, and clears the record of the TCM1 applied to domain 3 on node N. The allocated TCM1 is applied between node N and node I. | | | 654100 |
| J | After detecting that the node quits domain 8, the system puts the TCM3 recorded on node G that enters domain 8 back to the available TCMs, and clears the record of the TCM3 applied to domain 8 on node G. The allocated TCM3 is applied between node G and node J. | | | 654130 |
| E | The system detects no node entering or quitting the domain, and performs no processing. | | | 654130 |
| D | After detecting that the node enters domain 3, the system selects an element (3) from the available TCMs, and records that the current node (D) seizes TCM3, which is to be applied to domain 3. | 3 | 3 | 654100 |
| C | After detecting that the node quits domain 4, the system puts the TCM2 recorded on node H that enters domain 4 back to the available TCMs, and clears the record of the TCM2 applied to domain 4 on node H. The allocated TCM2 is applied between node H and node C. | | | 654120 |
| C | After detecting that the node enters domain 2, the system selects an element (2) from the available TCMs, and records that the current | 2 | 2 | 654100 |

TABLE 2-continued

| Node | Step | Seized TCM | Corresponding domain | Available TCM |
|------|------|------------|---------------------|---------------|
|  | node (C) seizes TCM2, which is to be applied to domain 2. | | | |
| B | After detecting that the node enters domain 1, the system selects an element (1) from the available TCMs, and records that the current node (B) seizes TCM1, which is to be applied to domain 1. | 1 | 1 | 654000 |
| A | After detecting that the node quits domain 3, the system puts the TCM3 recorded on node D that enters domain 3 back to the available TCMs, and clears the record of the TCM3 applied to domain 3 on node D. The allocated TCM3 is applied between node D and node A. | | | 654300 |
| A | After detecting that the node quits domain 2, the system puts the TCM2 recorded on node C that enters domain 2 back to the available TCMs, and clears the record of the TCM2 applied to domain 2 on node C. The allocated TCM2 is applied between node C and node A. | | | 654320 |
| A | After detecting that the node quits domain 1, the system puts the TCM1 recorded on node B that enters domain 1 back to the available TCMs, and clears the record of the TCM1 applied to domain 1 on node B. The allocated TCM1 is applied between node B and node A. | | | 654321 |

To sum up, the TCM levels are allocated as follows through the above process:

| No. | TCM level | Source node | Intermediate node | Sink node | Domain |
|-----|-----------|-------------|-------------------|-----------|--------|
| 1 | TCM4 | Y | None | X | 6 |
| 2 | TCM3 | Y | X | W | 7 |
| 3 | TCM2 | Y | XW | V | 8 |
| 4 | TCM3 | W | VUPQ | R | 5 |
| 5 | TCM2 | P | QR | S | 3 |
| 6 | TCM2 | S | None | T | 6 |
| 7 | TCM2 | O | N | M | 4 |
| 8 | TCM3 | R | STON | M | 7 |
| 9 | TCM4 | Q | RSTONM | L | 8 |
| 10 | TCM3 | M | L | K | 5 |
| 11 | TCM3 | F | None | G | 1 |
| 12 | TCM2 | M | LKJI | H | 2 |
| 13 | TCM1 | N | MLKJ | I | 3 |
| 14 | TCM3 | G | HI | J | 8 |
| 15 | TCM2 | H | IJED | C | 4 |
| 16 | TCM3 | D | CB | A | 3 |
| 17 | TCM2 | C | B | A | 2 |
| 18 | TCM1 | B | None | A | 1 |

Step 203: Non-intrusive monitoring in a segment is set.

On the ODUk service trail of service 2, the system specifies the nodes that need non-intrusive monitoring among the nodes that use each TCM level. For example, the system specifies node P for performing non-intrusive monitoring among nodes W, U, V, P, Q, and R that use TCM3; the system specifies node K for performing non-intrusive monitoring among nodes N, M, L, K, J, and I that use TCM1; the system specifies node D for performing non-intrusive monitoring among nodes H, I, J, E, D, and C that use TCM2.

Step 204; A prompt about the allocation results to the user is sent.

Figure 1:
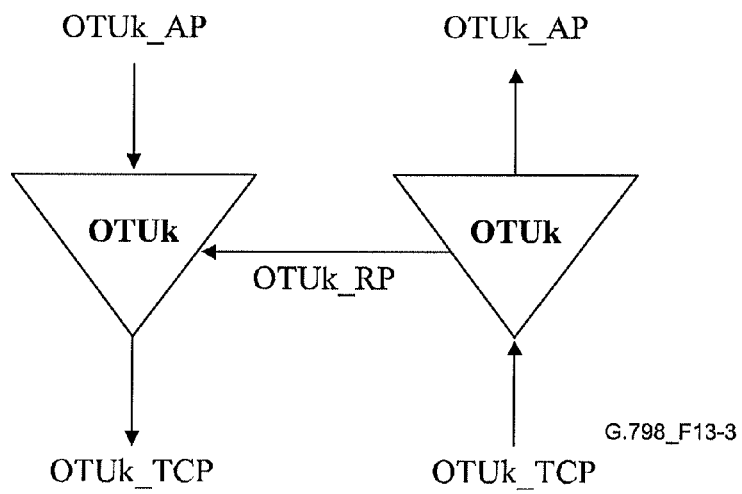
FIG. 1 shows combination of unidirectional sink and source functions into bidirectional function in the prior art.
Figure 11:
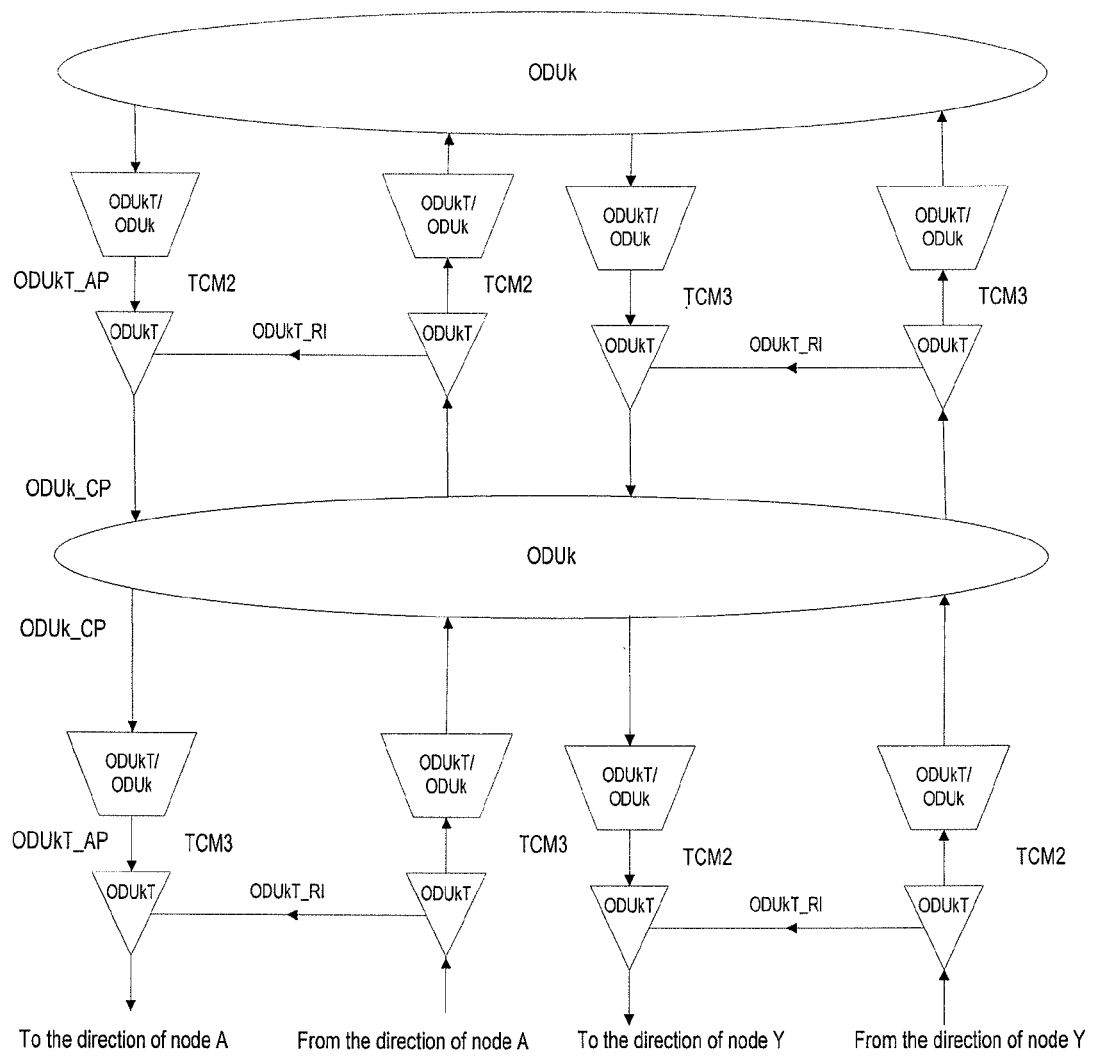
FIG. 11 shows the atomic function of node M in both directions shown in FIG. 10.

The allocation results include: result of allocating each TCM level among different nodes, order of handling TCM different TCM levels in one node, and location relations of cross functions. For the allocation results of different TCM levels, see the above-mentioned summary. If the user selects a node such as node M, the system provides a function block diagram that shows how node M handles the TCM function, as shown in FIG. 11. In this case, the TCM level is allocated to both directions of node M, and the atomic function in both directions is shown in FIG. 1.

Step 205: The NMS determines whether to deliver the allocation results to the device according to the allocation results and the specified conditions (for example, order of handling TCM levels the service direction).

If the allocation result meets the specified condition, for example, the allocation result is: The order of handling TCM from direction A is "TCM2 to TCM3", the order of handling TCM to direction A is "TCM3 to TCM2"; and the specified condition is also: The order of handling TCM from direction A is "TCM2 to TCM3", the order of handling TCM to direction A is "TCM3 to TCM2", then the NMS will deliver the result of above-mentioned automatic allocation and configuration to the device, and then perform step 207; if the allocation result conflicts with the specified condition, for example, the allocation result is: The order of handling TCM from direction A is "TCM3 to TCM2" and the order of handling TCM to direction A is "TCM2 to TCM3" but the specified condition is: The order of handling TCM from direction A is "TCM2 to TCM3" and the order of handling TCM to direction A is "TCM3 to TCM2", the NMS will perform step 206. In this embodiment of the invention, the allocation result conflicts with the specified condition.

Step 206: The handling order of each function is adjusted.

The NMS changes the order of handling TCM from direction A to "TCM2 to TCM3", and changes the order of handling TCM to direction A to "TCM3 to TCM2". The order of handling TCM from direction Y and to direction Y remains unchanged. The NMS delivers the result of above-mentioned automatic allocation and configuration adjustment to the device, and then performs step 207.

Step 207: Other TCM-related items is set.

Based on the results of allocating TCM in the previous step, the NMS provides the specific configuration interface to the user according to the state of using each TCM level on different nodes.

For example, for the TCM4 used among nodes Y and X, as regards the source node Y, the user needs to set transmitting-related attributes of TCM4, including deliverable TTI. As regards the sink node X, the user needs to set receiving-related attributes, including: enabling of insertion of maintenance signals (AIS) for subsequent ODUk trails; enabling of transferring TCM signal failure and deterioration information to the subsequent layer; enabling of subsequent actions of TIM and LTC (LTCActDis); setting receivable TTI of TCM; setting TIM detection mode of TCM to SAPI+DAPI; and setting BIP-8 alarm threshold of TCM.

For the TCM3 used among nodes Y, X, and W, as regards the source node Y, the user needs to set transmitting-related attributes of TCM3, including deliverable TTI. As regards the sink node W, the user needs to set receiving-related attributes, including: enabling of insertion of maintenance signals (AIS) for subsequent ODUk trails; enabling of transferring TCM signal failure and deterioration information to the subsequent layer; enabling of subsequent actions of TIM and LTC (LTCActDis); setting receivable TTI of TCM; setting TIM detection mode of TCM to SAPI+DAPI; and setting BIP-8 alarm threshold of TCM.

For the TCM2 used among nodes Y, X, W and V, as regards the source node Y, the user needs to set transmitting-related attributes of TCM2, including deliverable TTI. As regards the sink node V, the user needs to set receiving-related attributes, including: enabling of insertion of maintenance signals (AIS) for subsequent ODUk trails; enabling of transferring TCM signal failure and deterioration information to the subsequent layer; enabling of subsequent actions of TIM and LTC (LTCActDis); setting receivable TTI of TCM; setting TIM detection mode of TCM to SAPI+DAPI; and setting BIP-8 alarm threshold of TCM.

In this way, the user can set the 18 source nodes and sink nodes of each TCM level applied to each segment, and set the nodes that enable the non-intrusive monitoring of the corresponding TCM level.

Step 208: The TCM is enabled.
Setting the enabling function of each TCM level.
Step 209: Whether any other ODUk needs to use TCM is checked.
If any, the system performs step 201; or else step 210.
Step 210: The process is ended.

As mentioned above, the present invention enables the system to allocate TCM levels automatically after the user makes necessary settings, without manual allocation by the user.

In the above-mentioned example, the automatic allocation process is handled at the NMS in a centralized way. The automatic allocation is suitable for an NMS that manages a large network, where the source, sink and intermediate nodes of all ODUk services are managed by the NMS. Moreover, the NMS can enable each TCM level of each node, namely, activate the TCM function of each node.

In case that networks are managed by different NMSs, TCM levels can be allocated in a distributed way automatically, Each NMS delivers the following information to the managed nodes: state of networks managed by the NMS; composition of each domain managed by the NMS; and the scope of managed nodes traversed by the ODUk service that needs to be monitored through TCM. Then the TCM levels are allocated automatically along the service trail in a distributed way. One of the NMSs triggers the process of allocating the TCM automatically, starting from the source node of the service. Through the overhead of ODUk (for example, TCM-ACT), the NMS transfers the information about previous allocation along each node, including the information about the current node, seized TCM level, serial number of the corresponding domain, and the remaining available TCM levels. The TCM levels are allocated along each node in a distributed way, and the allocation result is reported to the NMS that manages each node.

Upon completion of the TCM allocation, one of the NMSs may issue an enabling or disabling command to a managed node, and this node transfers the activation or deactivation information to the service source or the service sink through the ODUk overhead (for example, TCM-ACT) along each node.

In the case of activation, the activation information is transferred through TCM-ACT to all nodes on the ODUk trail to activate all source nodes that use TCM on the ODUk trail. Afterward, the activation information is transferred through TCM-ACT to all nodes on the ODUk trail to activate all sink nodes that use TCM on the ODUk trail. In the case of deactivation, the deactivation information is transferred through TCM-ACT to all nodes on the ODUk trail to deactivate all sink nodes that use TCM on the ODUk trail. Afterward, the deactivation information is transferred through TCM-ACT to all nodes on the ODUk trail to deactivate all source nodes that use TCM on the ODUk trail.

Referring to the above example, in the case of activation, the source nodes are activated through the first information interaction from TCM4 function in the transmitting direction of node Y numbered 1 to TCM3 function in the transmitting direction of node Y numbered 2, TCM2 function in the transmitting direction of node Y numbered 3, TCM3 function in the transmitting direction of node W numbered 4, until TCM1 function in the transmitting direction of node B numbered 18. Afterward, the sink nodes are activated through the second information interaction from TCM4 function in the receiving direction of node X numbered 1 to TCM3 function in the receiving direction of node W numbered 2, TCM2 function in the receiving direction of node V numbered 3, TCM3 function in the receiving direction of node R numbered 4, until TCM1 function in the receiving direction of node A numbered 18.

Referring to the above example, in the case of deactivation, the sink nodes are deactivated through the first information interaction from TCM4 function in the receiving direction of node X numbered 1 to TCM3 function in the receiving direction of node W numbered 2, TCM2 function in the receiving direction of node V numbered 3, TCM3 function in the receiving direction of node R numbered 4, until TCM1 function in the receiving direction of node A numbered 18. Afterward, the source nodes are activated through the second information interaction from TCM4 function in the transmitting direction of node Y numbered 1 to TCM3 function in the transmitting direction of node Y numbered 2, TCM2 function in the transmitting direction of node Y numbered 3, TCM3 function in the transmitting direction of node W numbered 4, until TCM1 function in the transmitting direction of node B numbered 18.

That is, the embodiments of the present invention can allocate TCM levels automatically through either centralized control (for example, through an NMS) or distributed control (handling the TCM levels sequentially from the source node of the service, and transferring information through TCM ACT).

Figure 2:
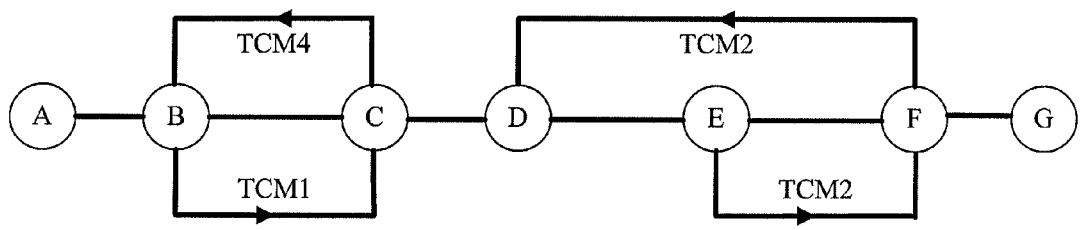
FIG. 2 shows mismatch of TCM configuration for services in two directions in the prior art.

Moreover, in the prior art, the user has to pay attention to the corresponding relationship of TCM for the services between both directions; the recommendations do not specify which TCM level of ODUkT_TT_Sk function can be commonly located (co-located) with a specific TCM level of ODUkT_TT_So function (namely, source co-located with sink), between which remote information (RI_XXX) can be transmitted. FIG. 1 displays how unidirectional sink and source functions combine into a bidirectional function, in which the Section Monitoring (SM) overhead in the OTUk Termination (OTUk_TT) function overhead is used to determine the OTUk trail state. Generally, the TCMs of the same level are co-located. In the prior art, however, the TCM is configured as required by the user. The user may make many possible settings. FIG. 2 shows mismatch of TCM configuration for services in two directions in the prior art.

For an ODU1 from node A to node G, the TCM is configured as follows:

| No. | TCM level | Source node | Intermediate node | Sink node |
|---|---|---|---|---|
| 1 | TCM1 | B | None | C |
| 2 | TCM2 | E | None | F |

For another ODU1 from node G to node A, the TCM is configured as follows:

| No. | TCM level | Source node | Intermediate node | Sink node |
|---|---|---|---|---|
| 1 | TCM2 | F | El | D |
| 2 | TCM4 | C | None | B |

Suppose that the TCM is used in this way: The TCM level for the service from B to C is different from the TCM level for the service from C to B; TCM1 is used for the service from A to G, but TCM4 is used for the service from G to A. In this case, the device needs to transfer remote information between different TCM levels according to the TCM allocation, thus enabling correct insertion of BDI, BEI and BIAE. For example, in the case that the service from direction B is received at node C, if ODU_AIS is detected, BDI should be inserted to the TCM4 for the service in the reverse direction. Even so, the result is not direct-viewing, and the user has to remember the corresponding relationship to get a better understanding.

The same TCM level (TCM2) is used between D, E and F, but the specific scope of using the TCM is different. In the direction from A to G, the use scope is E and F; in the direction from G to A, the use scope is F, E and D. In this case, it may be inappropriate to transfer remote information between nodes of the same TCM level. For example, bit errors occur in the service received at node F from E. Namely, the fiber between E and F as an effective segment of TCM2 may be broken. It may be inappropriate to insert BEI to the TCM2 of the ODU service in the reverse direction and return to node D for processing. That is because node B may regard the fiber between D, E and F as faulty, but cannot know whether the fiber between D and E or the fiber between E and F is faulty.

Figure 3:
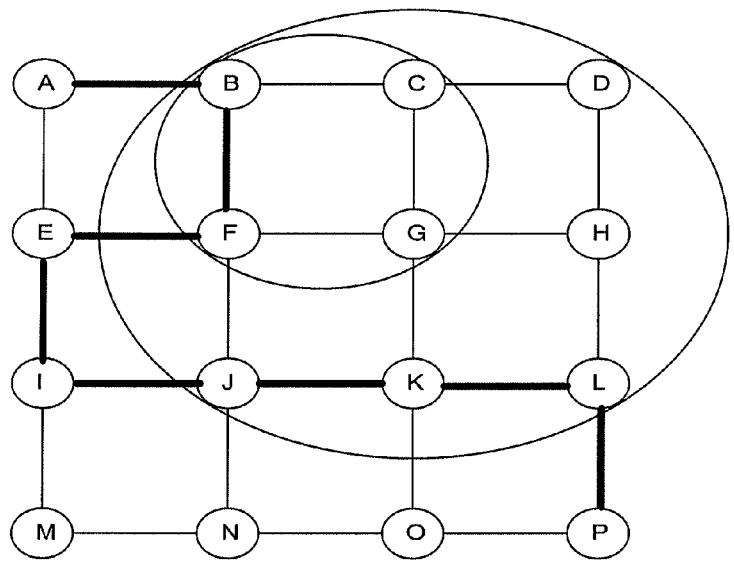
FIG. 3 shows an example of configuring different TCM levels for the same domain in the prior art.

Even if TCM is required in both directions and the same TCM level is required for both directions at a time, it is still possible that different TCM levels are allocated for the same scope. That is because the TCM levels for both directions are not necessarily configured at a time. It is possible that the TCM for one direction is required first and is configured separately, and then the TCM for the other direction is also required. Moreover, even if the TCM levels for both directions are configured at a time, other different TCM levels may still be configured. That is because it is possible that the domain is different but the scope of domains traversed by the trail is the same. As shown in FIG. 3, the domain is different. Domain 1 contains four nodes, and domain 2 contains nine nodes. However, as regards the ODU from A to P, the BF segment traverses domain 1 and domain 2 simultaneously. In this case, it is not necessary to allocate two TCM levels to the two different domains. If the service in one direction allocates TCM1 to domain 1 and the service in the other direction allocates TCM4 to domain 2, the same scope will have different TCM levels. In this way, it is still a problem as to whether to transmit remote information between different TCM levels in two directions.

As revealed in the allocation result for the service in both directions, the method under the embodiment of the present invention makes the TCM level for the service in one direction correspond to the TCM level for the service in the other direction, namely, the same level of TCM is applied to the same segment of the same domain in both directions. Therefore, the remote information (RI_XXX) can be transferred between the services of the same TCM level, without considering more complicated processing. That makes the user understand more easily.

Moreover, in the prior art, the relation between different TCM levels in a node depends on the relative location as against the connection function.

According to the ITU-T G.798 recommendations, The connection function of ODUk (ODUk_C) can transfer Service Signal Failure (SSF) from input to output. Different TCM levels are handled by the ODUk Tandem connection sublayer Termination Sink (ODUkT_TT_Sk) function and the ODUk Tandem connection sublayer Termination Source (ODUkT_TT_So) function separately. In this way, multiple ODUkT_TT_Sk and ODUkT_TT_So functions may be connected with the connection function separately, and may transfer SSF to the connection function. Moreover, the SSF may be transferred between different TCM levels. The specific transfer process depends on the signal flow direction and the relative location between the TCM function and the connection function. The specific outcome varies between different circumstances.

Figure 4:
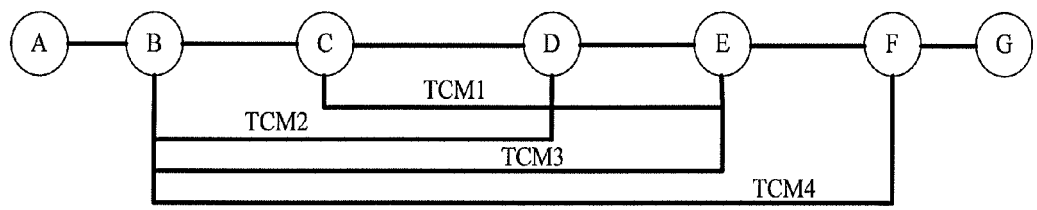
FIG. 4 shows TCM applications related to the location of the connection function in the prior art.

FIG. 4 shows TCM applications related to the location of the connection function in the prior art. Node E needs to terminate TCM1 and TCM3. During the processing of node E, if the signal flow direction is from the TCM1 termination function to the ODUk connection function and then the TCM3 termination function, the TCM1 may transfer SSF to TCM3. In this case, some defects of TCM1 may affect TCM3. During the processing of node E, if the signal flow direction is from the TCM3 termination function to the ODUk connection function and then the TCM1 termination function, the TCM3 may transfer SSF to TCM1. In this case, as contrary to the above-mentioned circumstance, some defects of TCM3 may affect TCM1.

However, under the present invention, the order of handling TCM levels and the relation with the connection function comply with the allocated order by default, so that the AIS and BDI can be inserted correctly with the unique result. The order of handling can also be adjusted by the user. For example, at node M, TCM2 and TCM3 need to be handled separately.

TCM2 and TCM3 of ODU1 in the forward direction:

| No. | TCM level | Source node | Intermediate node | Sink node | Domain |
|---|---|---|---|---|---|
| 7 | TCM3 | K | L | M | 5 |
| 8 | TCM2 | H | GFKL | M | 2 |

-continued

| No. | TCM level | Source node | Intermediate node | Sink node | Domain |
|-----|-----------|-------------|-------------------|-----------|--------|
| 10  | TCM2      | M           | N                 | O         | 4      |
| 12  | TCM3      | M           | NOTS              | R         | 7      |

TCM2 and TCM3 of ODU1 in the reverse direction:

| No. | TCM level | Source node | Intermediate node | Sink node | Domain |
|-----|-----------|-------------|-------------------|-----------|--------|
| 7   | TCM2      | O           | N                 | M         | 4      |
| 8   | TCM3      | R           | STON              | M         | 7      |
| 10  | TCM3      | M           | L                 | K         | 5      |
| 12  | TCM2      | M           | LKJI              | H         | 2      |

Figure 14:
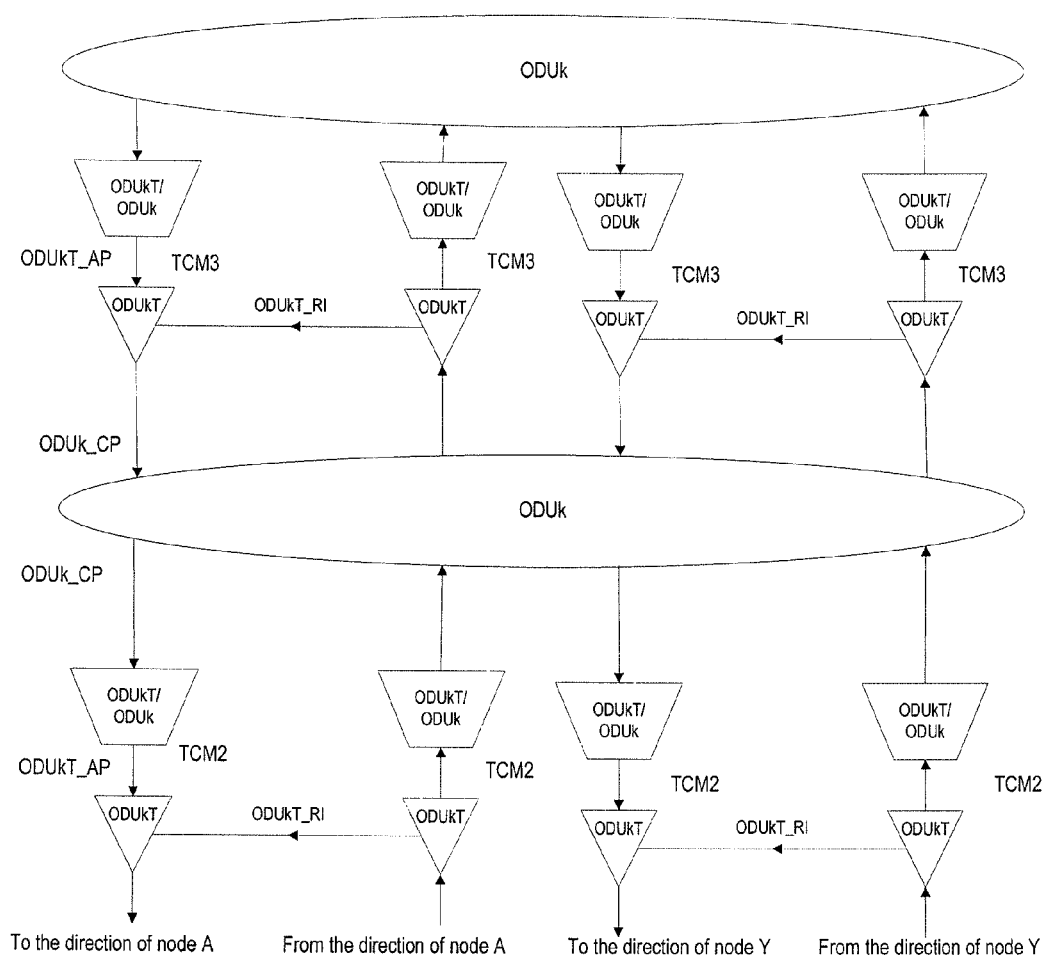
FIG. 14 shows the adjusted atomic function of node M in both directions shown in FIG. 11.

At node M, if the TCM levels are handled in the allocated order, the atomic function model of the TCM function of node M is shown in FIG. 11. The atomic function model of the TCM function of node M after adjustment performed by the user in step 206 is shown in FIG. 14.

The sink function of TCM2 from direction A transfers remote information to the source function of TCM2 bound to direction A. The sink function of TCM3 from direction A transfers remote information to the source function of TCM3 bound to direction A.

The sink function of TCM2 from direction Y transfers remote information to the source function of TCM2 bound to direction Y. The sink function of TCM3 from direction Y transfers remote information to the source function of TCM3 bound to direction Y.

According to the allocated order, for the functions from direction A, the NMS handles TCM2 first, and then handles the connection function and then TCM3. As a result, the SSF caused by the TCM2-related defect is transferred to TCM3. For the functions from direction Y, the NMS handles TCM2 first, and then handles the connection function and then TCM3. As a result, the SSF caused by the TCM2-related defect is transferred to TCM3.

Figure 5:
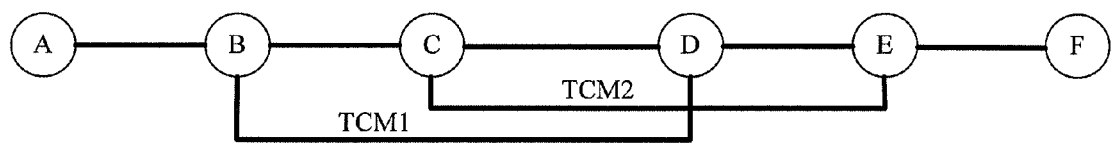
FIG. 5 shows the applications in the case of TCM overlapping in the prior art.

Moreover, in the prior art, different TCM levels between nodes affect each other. FIG. 5 shows overlapping of TCM levels. As shown in FIG. 5, an ODU1 service (service 1) goes from node A through B, C, D and E to node F. The TCM levels of service 1 are allocated below:

| No. | TCM level | Use scope | Intermediate node |
|-----|-----------|-----------|-------------------|
| 1   | TCM1      | BD        | C                 |
| 2   | TCM2      | CE        | D                 |

Moreover, non-intrusive monitoring is performed for TCM2 on node C.

The reverse direction service (service 2) corresponding to service 1 goes from node F through E, D, C and B to node A. Suppose that the TCM levels allocated for service 2 are as follows:

| No. | TCM level | Use scope | Intermediate node |
|-----|-----------|-----------|-------------------|
| 1   | TCM1      | DB        | C                 |
| 2   | TCM2      | EC        | D                 |

TCM1_LCK is inserted on node B, or TCM2_LCK is inserted on node C.

Figures 6, 7:
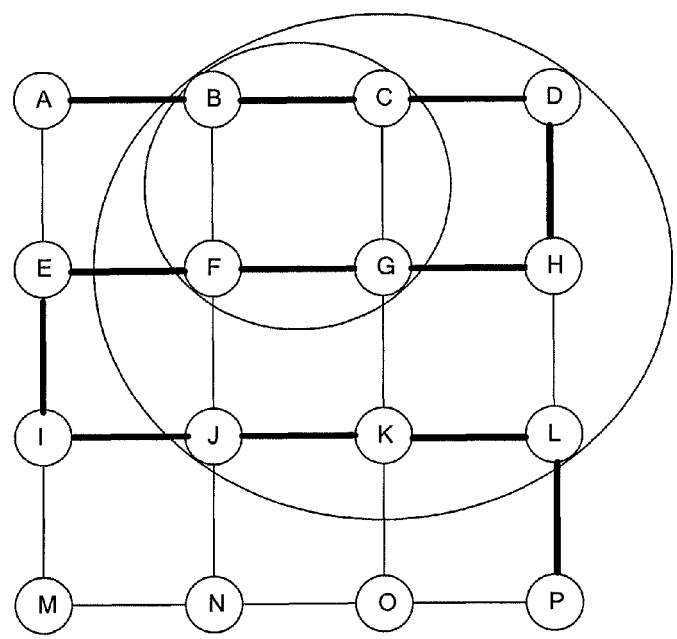
FIG. 6 shows the LCK with "0101" inserted into the TCM overhead in the prior art.
FIG. 7 shows the inter-domain relations and service trails in the prior art.
Figure 8:
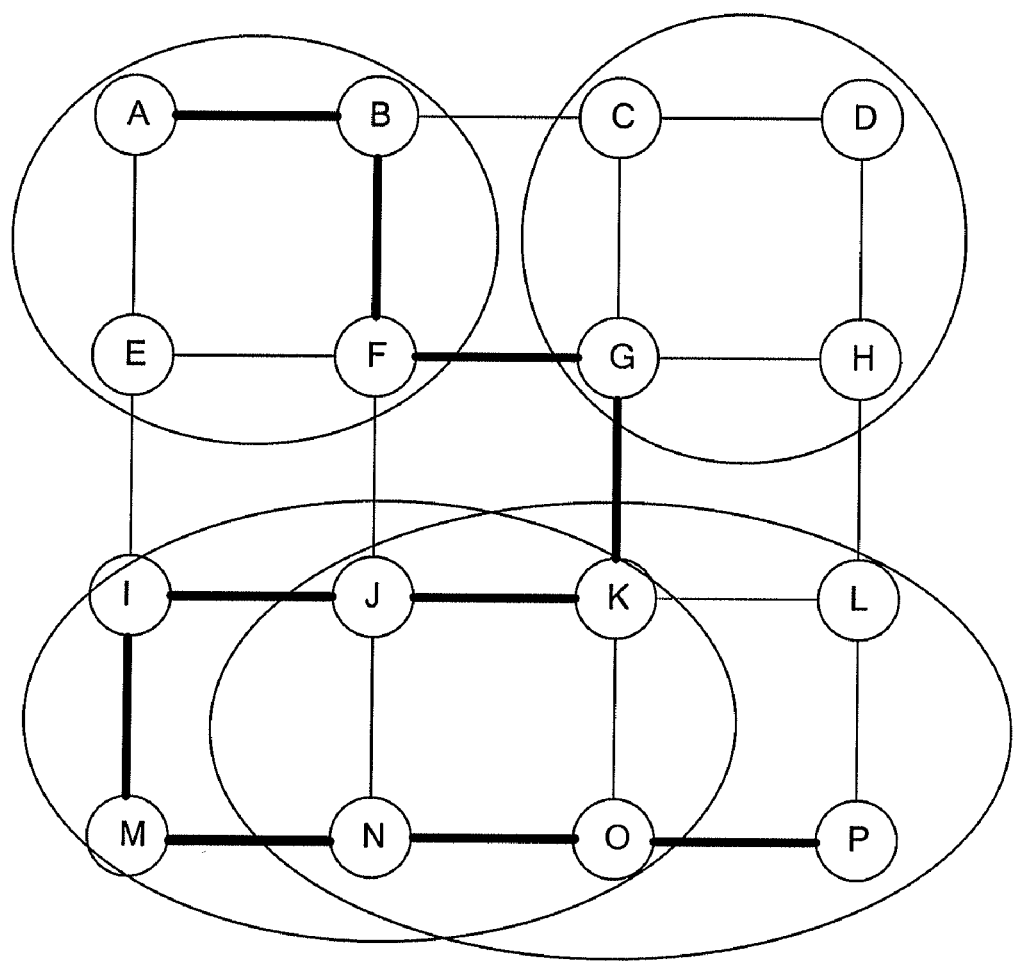
FIG. 8 shows the trail of a service which passes through only one node (such as G) of a domain in the prior art.

This LCK inserts "0101" to the STAT of the overheads of all payloads and all six TCM levels. As shown in FIG. 6, TCM1_LCK is detected at node D, and TCM1_AIS/SSF is detected at node E. In FIG. 6, FA OH represents Frame Alignment Overhead, OTUk OH C represents overhead of OTU of k order, and STAT represents state field.

Bits 6, 7 and 8 of STAT of TCM1 are written as 101. In this case, the AIS of TCM1 of ODUL will be inserted at node D. In this way, the sink node E of TCM2 will detect AIS of TCM2. Finally, TCM2 is applied in the scope from C to E, LCK of TCM1 is inserted to source node B and is changed before arriving at the sink node E, and is changed to AIS of TCM2 at the sink node.

After the AIS is inserted, the Fault Type Fault Location (FTFL) can still be used effectively. However, as shown in Table 3, the fault indication code of FTFL defined in G.709 currently cannot tell whether the cause is OCI or LCK or other factors.

TABLE 3

| Fault indication code | Description    |
|-----------------------|----------------|
| 0000 0000             | No Fault       |
| 0000 0001             | Signal Fail    |
| 0000 0010             | Signal Degrade |
| 0000 0011             | Reserved       |
| .                     |                |
| .                     |                |
| 1111 1111             |                |

Through the TCM configuration under the present invention, the order of handling multiple TCM levels and the relation with the connection function can be handled according to the allocated order. Moreover, SSF can be transferred between two levels of TCM functions according to the signal flow direction, regardless of whether a connection function exists between the two TCM functions or not. Namely, the TCM level handled first transfers the SSF to the TCM handled later.

Remote information is transferred between the sink function and the source function of the same TCM level. Remote information is not transferred directly between the sink function and the source function of different TCM levels. However, mutual influence may occur between different TCM levels. The SSF is transferred between different TCM levels so as to affect the processing of remote information through SSF.

In the case that one node regenerates or terminates multiple TCMs, the system provides an interface for the user to set whether to transfer SSF between multiple TCM functions.

The system provides an interface for the user to set whether LCK and OCI are used as conditions of inserting AIS.

When LCK and OCI serve as conditions of inserting AIS to the intermediate node of the service, the configuration is expressed through FTFL. The fault indication code in FTFL is byte 0 in the multiframe of FTFL used for forward fault indication, and byte 128 in the multiframe of FTFL used for reverse fault indication, as defined below. After an AIS is inserted at the intermediate node, the system can detect the cause for the AIS insertion through assistance of FTFL, as shown in Table 4.

TABLE 4

| bit 123 | | bit 45 | | bits 678 | |
|---|---|---|---|---|---|
| 000-111 | Reserved | 00 | No Fault | 101 | ODUk-LCK |
| | | 01 | Signal Fail | 110 | ODUk-OCI |
| | | 10 | Signal Degrade | 111 | ODUk-AIS |
| | | 11 | Reserved | 000-100 | Reserved |

Taking FIG. 5 as an example, TCM1_LCK is inserted on node B, or TCM2_LCK is inserted on node C.

In the above-mentioned two cases, TCM1_LCK will be detected on node D. If LCk is enabled as a condition of inserting AIS, the AIS of TCM1 of ODUL will be inserted on node D. Meanwhile, bits 6, 7 and 8 of FTFL are input as 101. In this way, the sink node E of TCM2 will detect AIS of TCM2. In addition, with bits 6, 7 and 8 of FTFL being 101, the system can detect the cause for AIS as ODUk_LCK by reference to Table 4.

Moreover, as shown in this embodiment of the invention, if there are more than six domains (there are eight domain in this embodiment), the method under the present invention can also handle TCM properly.

Figure 15:
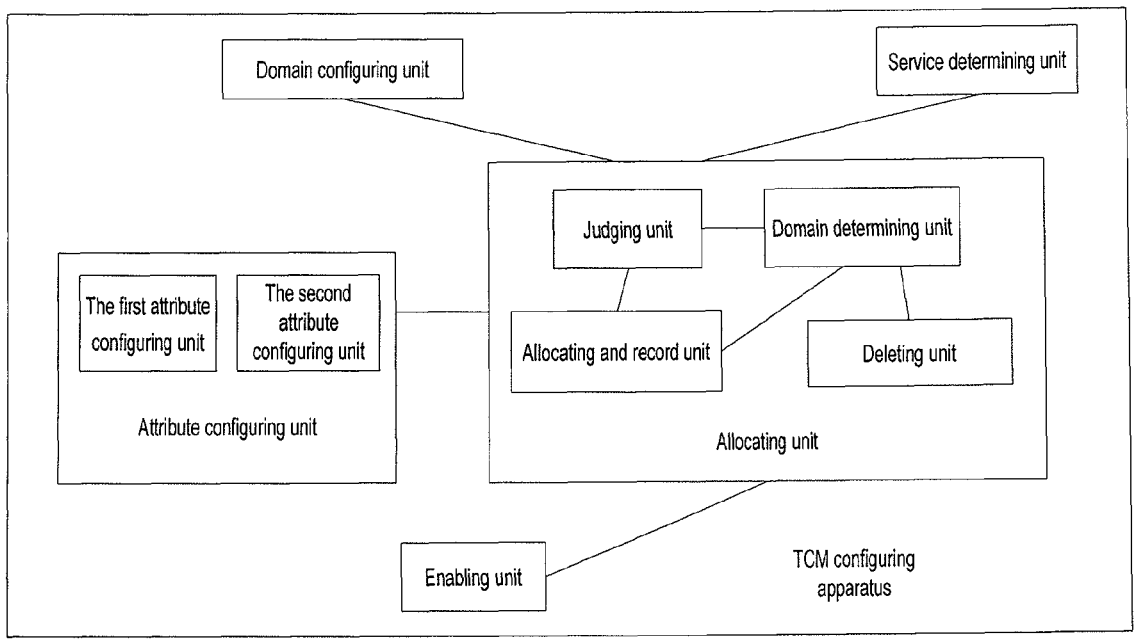
FIG. 15 shows an apparatus for allocating TCM in an embodiment of the present invention.

As shown in FIG. 15, an apparatus for configuring TCM disclosed in an embodiment of the present invention includes: (i) a domain configuring unit, adapted to configure the domains that need TCM in a network and the scope of domains; (ii) a service determining unit, adapted to determine the ODUk service that needs TCM; (iii) an allocating unit, adapted to allocate TCM automatically according to the trail of the ODUk service determined by the determining unit and the domain configured by the configuring unit; (iv) an enabling unit, adapted to enable or disable each TCM level allocated by the allocating unit; and (v) an attribute configuring unit, adapted to configure TCM attributes according to the TCM allocation result.

The attribute configuring unit includes: a first attribute configuring unit, adapted to configure the transmitting-related attributes of the source node that uses TCM; and a second attribute configuring unit, adapted to configure the receiving-related attributes of the sink node that uses TCM.

The current node is the source node, and the allocating unit includes: (i) a judging unit, adapted to judge whether the current node is a sink node, and, if so, finish the procedure; or else start the domain determining unit; (ii) a domain determining unit, adapted to determine the domain that the current node enters; (iii) an allocation recording unit, adapted to sequentially allocate and record the TCM seized by the current node corresponding to the domain that contains the node, use the next node as the current node, and start the judging unit; (iv) a deleting unit, adapted to retrieve the node along the service trail, and, if the node quits the domain, put the TCM recorded on the node that quits the domain back to the TCM register, and clear the TCM record.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for allocating and configuring Tandem Connection Monitoring (TCM) in a network, comprising:
   selecting a domain among a plurality of domains to be monitored using TCM;
   determining a service of Optical Data Unit (ODU) of k order (ODUk) to be monitored using TCM;
   allocating the TCM automatically according to an ODUk service trail and the selected domain; and
   enabling or disabling a TCM level of a plurality of TCM levels.

2. The method of claim 1, wherein prior to the step of enabling or disabling of the TCM level, performing at least one of:
   confirming a result of the allocating the TCM; or
   adjusting the allocation of the plurality of TCM levels among a plurality of nodes and an order of handling the TCM levels in a node of the plurality of nodes.

3. The method of claim 1, wherein, prior to the step of enabling or disabling of a TCM level is performed:
   configuring TCM attributes according to a TCM allocation result.

4. The method of claim 1, wherein the step of enabling or disabling of a TCM level comprises:
   configuring the enabling or disabling of the TCM level; or
   configuring the enabling or disabling of the TCM level for a node of a plurality of nodes, and enabling or disabling the TCM level of all of the nodes using information interaction between the nodes.

5. The method of claim 1, wherein: at least one of:
   the ODUk service is set prior to a TCM configuration, or
   the ODUk service is configured during the TCM configuration.

6. The method of claim 3, wherein the step of configuring TCM attributes according to the TCM allocation result comprises at least one of:
   setting transmitting-related attributes for a source node that uses the TCM level; or
   setting receiving-related attributes for a sink node that uses the TCM level.

7. The method of claim 6, wherein:
   the setting of transmitting-related attributes comprises setting a deliverable (Trail Tracking Identifier (TTI); and
   the setting of receiving-related attributes comprises at least one of: setting whether to enable insertion of a maintenance signal into a subsequent ODUk trail; setting whether to transfer a TCM signal failure and deterioration information to a subsequent layer; setting enabling of a subsequent action of a Trail Identifier Mismatch (TIM) and a Loss of Tandem Connection (LTC); setting a receivable TTI of TCM; setting a TIM detection mode of the TCM; setting a BIP-8 alarm threshold of TCM; setting whether to use a locking (LCK) or an Open Circuit Indication (OCI) as a condition of inserting an Alarm Indication Signal (AIS), and, setting whether to insert the LCK manually, respectively.

8. The method of claim 7, further comprising at least one of the steps of: inserting the maintenance signal to an overhead and a payload according to the configuration and a received signal if a user sets to enable insertion of the maintenance signal into the subsequent ODUk trail;
   transferring a least one of Trail Signal Failure or Service Signal Failure (SSF) information to the subsequent layer when a defect is detected as a condition of generating the TSF or the SSF if a user sets to transfer the TCM signal failure and deterioration information to the subsequent layer;
   inserting the AIS to the overhead and the payload and transferring the TSF/SSF information to the subsequent layer when a LTC defect is detected, if a user sets to enable subsequent actions of Loss of Tandem Connection (LTC);

inserting an AIS when the LCK defect is detected, if a user sets the lock (LCK) as a condition for inserting AIS; and inserting the AIS when the OCI defect is detected, if a user sets to use the Open Circuit Indication (OCI) as a condition for inserting the AIS.

9. The method of claim 6, wherein the step of configuring TCM attributes according to the TCM allocation result further comprises:

setting, if the user sets enabling of non-intrusive monitoring, at least one of: transferring TCM signal failure and deterioration information to the subsequent layer; enabling of subsequent actions of Trail Identifier Mismatch (TIM) and Loss of Tandem Connection (LTC); a receivable (Trail Tracking Identifier (TTI) of TCM; a TIM detection mode of TCM; and a BIP-8 alarm threshold of TCM.

10. The method of claim 6, wherein:

processing performed according to the TCM attributes includes at least one of: (i) for the source node that uses a TCM level, performing the ODUk TCM Termination Source (ODUkT_TT_So) function and the ODUk TCM/ODUk Adaptation Source (ODUkT/ODUk_A_So) function; (ii) for the sink node that uses a TCM level, performing the ODUk TCM Termination Source (ODUkT_TT_Sk) function and the ODUk TCM/ODUk Adaptation Source (ODUkT/ODUk_A_Sk) function; and (iii) if the user sets a protection group related to the TCM level, using the defects with respect to the TCM level as a protection switching condition to perform protection switching.

11. The method of claim 1, wherein the step of allocating TCM automatically comprises:

(a) determining an available TCM register;
(b) determining the domain at which the service arrives for a node on a service trail, allocating and recording the TCM seized by the node corresponding to the determined domain, sequentially; and
(c) retrieving the node next to the node on the service trail, and repeating step (b) for all nodes on the service trail.

12. The method of claim 11, wherein prior to determining the domain that the node on the service trail enters, performing the step of:

selecting a node along the service trail; and, if the node quits the determined domain, putting the TCM recorded on the node that quits the determined domain back to the available TCM register sequentially, and clearing the TCM record.

13. The method of claim 11, wherein the step of determining the available TCM register comprises:

determining whether the TCM is allocated to the service in a reverse direction; and, if the TCM is so allocated, initializing the TCM register available to a current TCM allocation in an order of the elements available in the TCM register, after the TCM level is allocated to the service in the reverse direction.

14. The method of claim 12, wherein the step of determining the domain at which the service arrives for the node on the service trail, allocating and recording the TCM seized by the node corresponding to the determined domain sequentially comprises further:

allocating TCM to the node for the determined domain if the node that quits the determined domain is not the same as the node that enters the determined domain.

15. The method of claim 11, wherein the step of determining the domain at which the service arrives for the node on the service trail, and allocating and recording the TCM seized by the node corresponding to the determined domain in a same order as an equivalent order of allocating TCM for the service in the reverse direction, if the service in the reverse direction is allocated.

16. The method of claim 12, wherein, in the step of the determining the domain at which the service arrives for the node on the service trail, and allocating and recording the TCM seized by the node corresponding to the determined domain in a same order as an equivalent order of allocating TCM for the service in the reverse direction if the service in the reverse direction is allocated.

17. The method of claim 12, wherein the selecting the node along the service trail; and, if the node quits the determined domain, putting the TCM recorded on the node that quits the domain back to the available TCM register sequentially and clearing the TCM record further comprises:

(a) selecting a node of the nodes along the service trail;
(b) selecting a previous node of the nodes in the source node direction along the service trail;
(c) retrieving the TCM record of the previous node sequentially, including the seized TCM levels and corresponding domains; and, if the node has no record, proceeding to step (d);
(e) determining whether the node in (a) is the node that quits the corresponding domain; and, if so, putting the TCM recorded on the node that enters the domain back into an available TCM register sequentially and clearing the TCM record;
(f) repeating step (c) and step (d) until all of the previous nodes are handled;
(g) repeating steps (b) through (e) until all nodes before the node retrieved in step (a) are handled.

18. The method of claim 3, wherein the step of configuring TCM attributes according to the TCM allocation result comprises:

setting a transfer of remote information between a sink function and a source function of different TCM levels; and setting not to transfer remote information between the sink function and the source function of different TCM levels.

19. An apparatus for configuring TCM, comprising:

a domain configuration unit, configured to select a domain among a plurality of domains to be monitored using TCM in a network;
a service determining unit, configured to determine an Optical Data Unit (ODU) of k order (ODUk) to be monitored using TCM;
an allocating unit, configured to allocate TCM automatically according to an ODUk service trail determined by the determining unit and the domain selected by the domain configuration unit; and
an enabling unit, configured to enable or disable a TCM level of a plurality of TCM levels.

20. The apparatus of claim 19, further comprising:

an attribute configuring unit, configured to configure the TCM attribute according to the TCM allocation result.

21. The apparatus of claim 20, wherein the attribute configuring unit comprises at least one of:

a first attribute configuring unit, configured to configure the transmitting-related attributes for a source node that uses the TCM level; or
a second attribute configuring unit, configured to configure the receiving-related attributes for a sink node that uses the TCM level.

22. The apparatus of claim 19, wherein for each current node on the ODUk service trail, the allocating unit comprises: an evaluation unit, a domain determining unit and an allocating and recording unit;

the evaluation unit, configured to evaluate whether the current node is not the sink node and, if the current node is not the sink node, start the domain determining unit;
the domain determining unit, configured to determine the domain that the current node enters; and
the allocating and recording unit, configured to sequentially allocate and record the TCM level seized by the current node that enters the domain, use the next node as the current node and start the evaluation unit.

23. The apparatus of claim 19 wherein the allocating unit further comprises:
a deleting unit, configured to retrieve a node of the nodes along the service trail; and, if the node quits the domain, put the TCM recorded onto the node that quits the domain back into an available TCM register sequentially, and clear the TCM record.

* * * * *

UNITED STATES PATENT AND TRADEMARK OFFICE
CERTIFICATE OF CORRECTION

| | | |
|---|---|---|
| PATENT NO. | : 8,189,485 B2 | Page 1 of 1 |
| APPLICATION NO. | : 12/354566 | |
| DATED | : May 29, 2012 | |
| INVENTOR(S) | : Jun Yan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this
Fourteenth Day of August, 2012

David J. Kappos
*Director of the United States Patent and Trademark Office*